(12) United States Patent
Darvishi

(10) Patent No.: US 12,500,565 B2
(45) Date of Patent: Dec. 16, 2025

(54) HIGH PASS POWER COMBINER WITH COUPLED INDUCTIVE ELEMENTS

(71) Applicant: Apple Inc., Cupertino, CA (US)

(72) Inventor: Milad Darvishi, San Diego, CA (US)

(73) Assignee: Apple Inc., Cupertino, CA (US)

( * ) Notice: Subject to any disclaimer, the term of this patent is extended or adjusted under 35 U.S.C. 154(b) by 432 days.

(21) Appl. No.: 17/746,714

(22) Filed: May 17, 2022

(65) Prior Publication Data

US 2023/0378927 A1 Nov. 23, 2023

(51) Int. Cl.
*H04B 1/04* (2006.01)
*H03F 3/19* (2006.01)
*H03H 7/46* (2006.01)
*H04B 1/16* (2006.01)

(52) U.S. Cl.
CPC .............. *H03H 7/466* (2013.01); *H03F 3/19* (2013.01); *H04B 1/16* (2013.01); *H03F 2200/294* (2013.01); *H03F 2200/451* (2013.01)

(58) Field of Classification Search
CPC . H03H 7/466; H03F 3/19; H04B 1/16; H04B 1/18; H04B 1/04
See application file for complete search history.

(56) References Cited

U.S. PATENT DOCUMENTS

| | | | |
|---|---|---|---|
| 8,374,557 B2 * | 2/2013 | Gorbachov | H01Q 21/0025 455/67.11 |
| 10,062,947 B2 * | 8/2018 | Huang | H03F 3/19 |
| 10,608,313 B2 | 3/2020 | Wang et al. | |
| 11,043,931 B2 | 6/2021 | Lin et al. | |
| 11,784,385 B2 * | 10/2023 | Yang | H03H 11/36 333/124 |
| 2010/0244981 A1 | 9/2010 | Gorbachov | |
| 2010/0270999 A1 * | 10/2010 | Lai | H01F 19/04 323/361 |
| 2018/0026601 A1 * | 1/2018 | Thorup | H03H 7/0123 333/125 |
| 2018/0167040 A1 * | 6/2018 | Sayilir | H03F 3/26 |
| 2022/0006171 A1 | 1/2022 | Yang et al. | |

* cited by examiner

*Primary Examiner* — Tuan Pham
(74) *Attorney, Agent, or Firm* — FLETCHER YODER PC

(57) ABSTRACT

An electronic device includes multiple antennas to transmit one or more signals, and a transmitter electrically coupled to the antennas. The transmitter has splitter circuitry that receives an input signal and generates the signals. The splitter circuitry includes a pair of inductive elements that are inductively coupled together. The splitter circuitry includes capacitive elements to absorb parasitic input and output capacitance. In additional or alternative embodiments, the splitter circuitry may be in the form of combiner circuitry and disposed in a receiver of the electronic device.

20 Claims, 14 Drawing Sheets

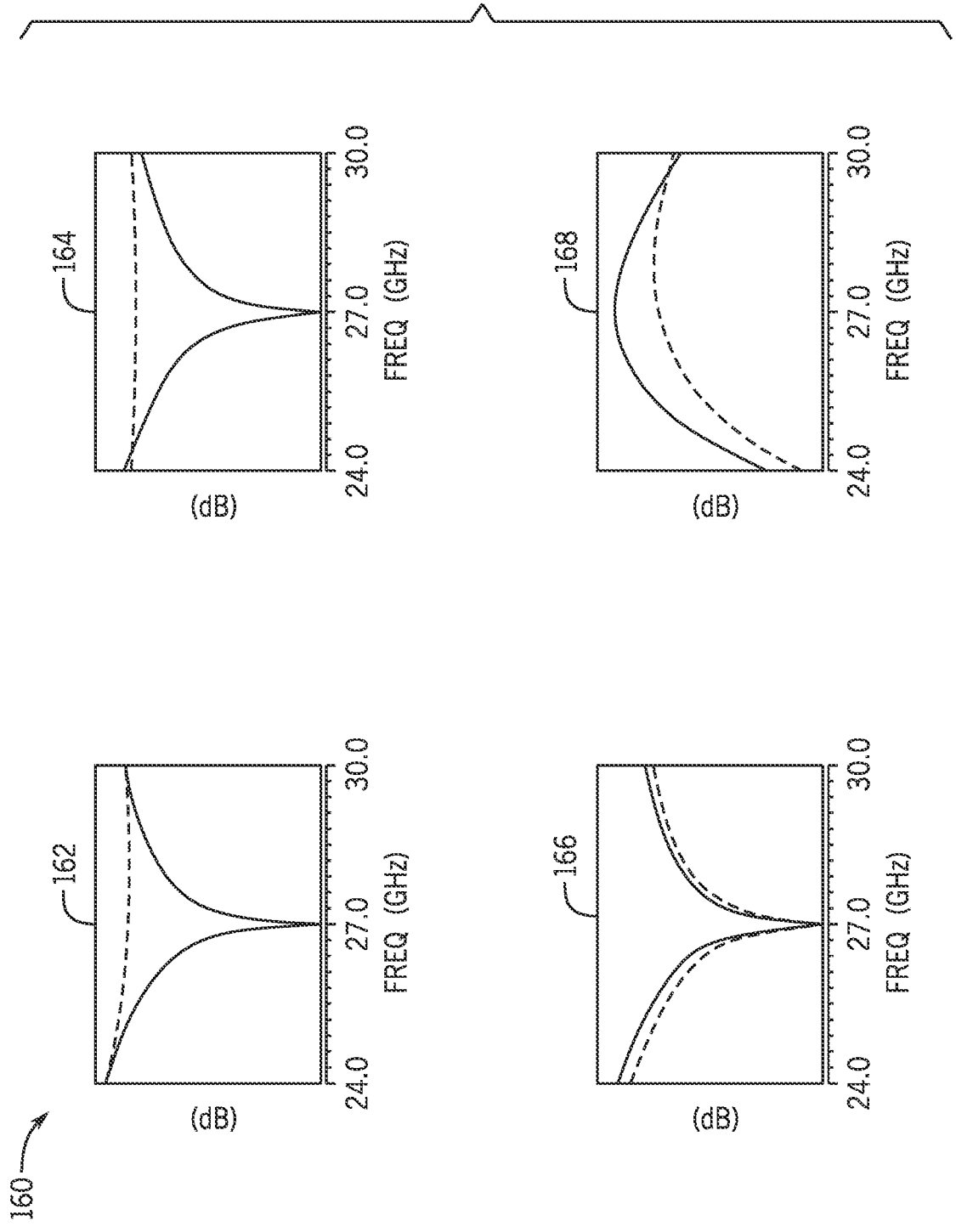

HIGH PASS POWER COMBINER WITH COUPLED INDUCTIVE ELEMENTS

BACKGROUND

The present disclosure relates generally to wireless communication, and more specifically to filtering out-of-band frequencies from an input signal.

In an electronic device, a transceiver may include one or more amplifiers coupled to splitter/combiner circuitry to facilitate beam-forming. The splitter/combiner circuitry may be used as a low-pass filter and/or high-pass filter to reject undesired frequencies in an input signal. As silicon devices continue to shrink in size, some components of the electronic device may not scale with the rest of the shrinking components. In particular, the splitter/combiner circuitry may include one or more components that have non-scalable silicon footprints when placed on a circuitry board, such as one or more inductors disposed in the splitter/combiner circuitry.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, splitter circuitry includes an input terminal, a first output terminal and a second output terminal, a first capacitive element and a second capacitive element coupled to the input terminal, a third capacitive element coupled to the first output terminal, and a fourth capacitive element coupled to the second output terminal. The splitter circuitry also includes a first inductor coupled to the first capacitive element and the third capacitive element, and a second inductor coupled to the second capacitive element and the fourth capacitive element, the first inductor and the second inductor being configured to inductively couple to one another.

In another embodiment, an electronic device includes multiple antennas to transmit a plurality of signals, a transmitter electrically coupled to the antennas, the transmitter including splitter circuitry that receives an input signal and generates the signals. The splitter circuitry includes an input terminal to receive the input signal, a first pair of capacitive elements coupled to the input terminal, and a pair of inductive elements configured to inductively couple together. Each inductive element of the pair of inductive elements is coupled to a respective capacitive element of the first pair of capacitive elements. The splitter circuitry also includes a second pair of capacitive elements, each capacitive element of the second pair of capacitive elements coupled to a respective inductive element of the pair of inductive elements. The splitter circuitry further includes a pair of output terminals, each output terminal of the pair of output terminals coupled to a respective capacitive element of the second pair of capacitive elements.

In yet another embodiment, a receiver includes a low noise amplifier and combiner circuitry coupled to the low noise amplifier. The combiner circuitry includes a first input terminal and a second input terminal, a first capacitive element coupled to the first input terminal, and a second capacitive element coupled to the second input terminal. The combiner circuitry also includes a first inductor coupled to the first capacitive element, and a second inductor coupled to the second capacitive element, the first inductor and the second inductor being configured to inductively couple to one another. The combiner circuitry also includes a third capacitive element coupled to the first inductor, a fourth capacitive element coupled to the second inductor, and an output terminal coupled to the third capacitive element and the fourth capacitive element.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

FIGS. 10A and 10B are graphs illustrating performance of the splitter/combiner circuitry of FIG. 5 with and without the one or more capacitive elements of FIG. 9, according to embodiments of the present disclosure;

DETAILED DESCRIPTION OF SPECIFIC EMBODIMENTS

Figure 1:
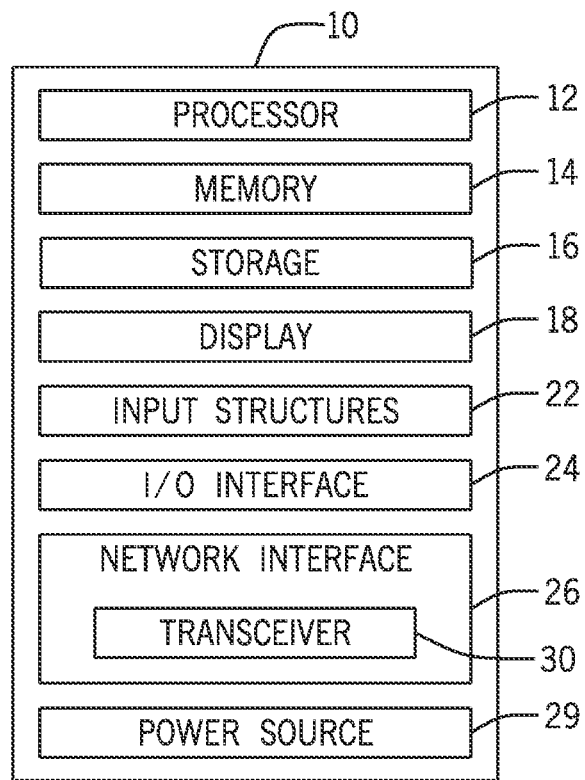
FIG. 1 is a block diagram of an electronic device, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on.

This disclosure is directed to reducing the silicon footprint of splitter/combiner circuitry in a transceiver and improving the efficiency of the splitter/combiner circuitry. As discussed above, silicon components in communication circuitry (e.g., the transceiver) are shrinking and, as such, smaller surface area is desired for the communication circuitry in a mobile electronic device. However, particular non-scalable components used in the communication circuitry may not scale with the silicon components coupled to the non-scalable components. This may limit the minimum amount of surface area to implement the communication circuitry and the components of the communication circuitry. A common configuration of the splitter/combiner circuitry may include capacitors and inductors to facilitate splitting an input signal and/or combining multiple input signals in a desired frequency range. In particular, inductors of the splitter/combiner circuitry may be non-scalable components that may not be shrinking or decreasing in size at the same rate as the other components in the splitter/configuration circuitry.

Embodiments herein provide various apparatuses to reduce the surface area of the splitter/combiner circuitry by coupling the inductors (e.g., inductively) in the splitter/combiner circuitry. By coupling the inductors, the overall surface area normally occupied by two parallel inductors may be reduced such that the entire splitter/combiner circuitry may occupy a smaller surface area. Additional components of the splitter/combiner circuitry that are coupled to the inductors may be adjusted to compensate for the coupled inductors. Furthermore, capacitors of the splitter/combiner circuitry may be configured to absorb parasitic output capacitance, to absorb parasitic input capacitance, and/or to further reduce the number of components in the transceiver by combining capacitors disposed in the circuit used to output-match an amplifier to the splitter/combiner circuitry.

With this in mind, FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a $6^{th}$ generation (6G) or greater than 6G cellular network, a satellite network, a non-terrestrial network, and so on. In particular, the network interface 26 may include, for example, one or more interfaces for using a cellular communication standard of the 5G specifications that include the millimeter wave (mm-Wave) frequency range (e.g., 24.25-300 gigahertz (GHz)) that defines and/or enables frequency ranges used for wireless communication. The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the electronic device 10 may include any suitable source of power, such as a rechargeable lithium polymer (Li-poly) battery and/or an alternating current (AC) power converter.

Figure 2:
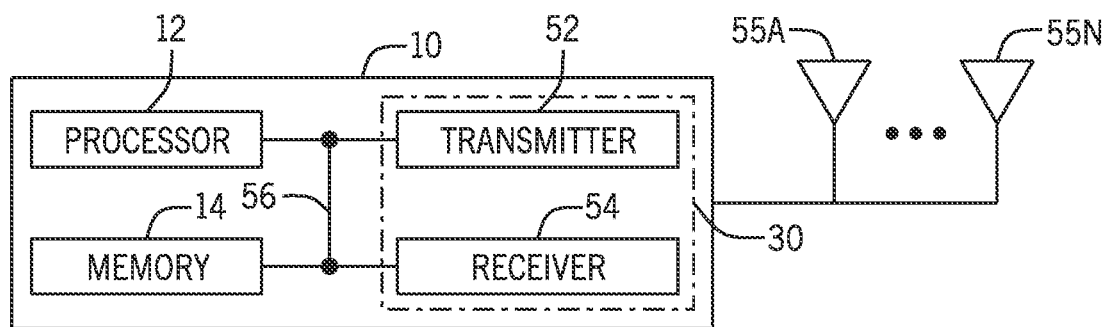
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The electronic device 10 may include the transmitter 52 and/or the receiver 54 that respectively enable transmission and reception of data between the electronic device 10 and an external device via, for example, a network (e.g., including base stations or access points) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figure 3:
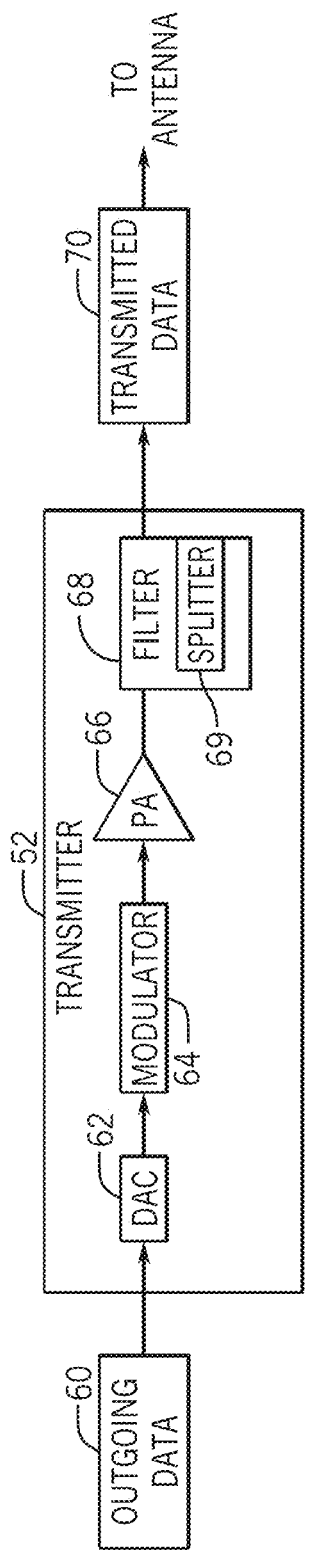
FIG. 3 is a schematic diagram of a transmitter of the electronic device of FIG. 1, according to embodiments of the present disclosure.

FIG. 3 is a schematic diagram of the transmitter 52 (e.g., transmit circuitry), according to embodiments of the present disclosure. As illustrated, the transmitter 52 may receive outgoing data 60 in the form of a digital signal to be transmitted via the one or more antennas 55. A digital-to-analog converter (DAC) 62 of the transmitter 52 may convert the digital signal to an analog signal, and a modulator 64 may combine the converted analog signal with a carrier signal to generate a radio wave. A power amplifier (PA) 66 receives the modulated signal from the modulator 64. The power amplifier 66 may amplify the modulated signal to a suitable level to drive transmission of the signal via the one or more antennas 55. A filter 68 (e.g., filter circuitry and/or software) of the transmitter 52 may then remove undesirable noise from the amplified signal to generate transmitted data 70 to be transmitted via the one or more antennas 55. The filter 68 may include any suitable filter or filters to remove the undesirable noise from the amplified signal, such as a bandpass filter, a bandstop filter, a low pass filter, a high pass filter, and/or a decimation filter. The filter 68 may include a splitter 69 to split the amplified signal prior to and/or following the removal of undesirable noise from the amplified signal. In particular, the splitter 69 may facilitate beam-forming with the split amplified signal via the one or more antennas 55. Additionally, the transmitter 52 may include any suitable additional components not shown, or may not include certain of the illustrated components, such that the transmitter 52 may transmit the outgoing data 60 via the one or more antennas 55. For example, the transmitter 52 may include a mixer and/or a digital up converter. As another example, the transmitter 52 may not include the filter 68 if the power amplifier 66 outputs the amplified signal in or approximately in a desired frequency range (such that filtering of the amplified signal may be unnecessary).

Figure 4:
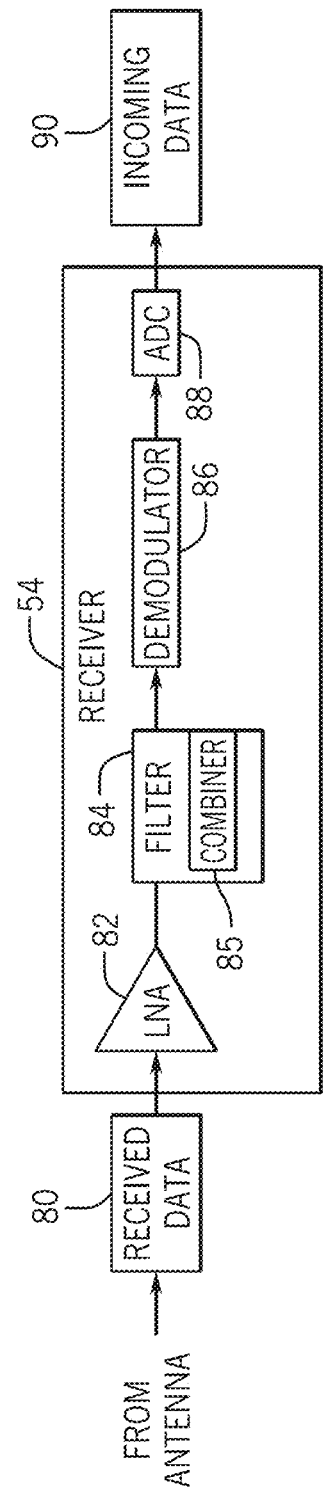
FIG. 4 is a schematic diagram of a receiver of the electronic device of FIG. 1, according to embodiments of the present disclosure.

FIG. 4 is a schematic diagram of the receiver 54 (e.g., receive circuitry), according to embodiments of the present disclosure. As illustrated, the receiver 54 may receive received data 80 from the one or more antennas 55 in the form of an analog signal. A low noise amplifier (LNA) 82 may amplify the received analog signal to a suitable level for the receiver 54 to process. A filter 84 (e.g., filter circuitry and/or software) may remove undesired noise from the received signal, such as cross-channel interference. The filter 84 may also remove additional signals received by the one or more antennas 55 that are at frequencies other than the desired signal. The filter 84 may include a combiner 85 to combine the received signals prior to and/or following the removal of frequencies other than those which are desired. The filter 84 may include any suitable filter or filters to remove the undesired noise or signals from the received signal, such as a bandpass filter, a bandstop filter, a low pass filter, a high pass filter, and/or a decimation filter. A demodulator 86 may remove a radio frequency envelope and/or extract a demodulated signal from the filtered signal for processing. An analog-to-digital converter (ADC) 88 may receive the demodulated analog signal and convert the signal to a digital signal of incoming data 90 to be further processed by the electronic device 10. Additionally, the receiver 54 may include any suitable additional components not shown, or may not include certain of the illustrated components, such that the receiver 54 may receive the received data 80 via the one or more antennas 55. For example, the receiver 54 may include a mixer and/or a digital down converter.

As discussed above, the splitter 69 and/or the combiner 85 may be coupled to the amplifier 82 in the transceiver 30 to split and/or combine outgoing or incoming signals. The splitter 69 and/or the combiner 85 may include one or more components that do not scale with shrinking silicon components frequently relied on the transceiver 30. By way of example, an inductive element (e.g., an inductor) of the splitter 69 and/or the combiner 85 may include a coil that cannot scale with silicon components without losing effectiveness. To remedy this, at least two inductors of the splitter 69 and/or the combiner 85 be inductively coupled to one another to reduce the surface area occupied by the splitter 69 and/or the combiner 85.

Figure 5:
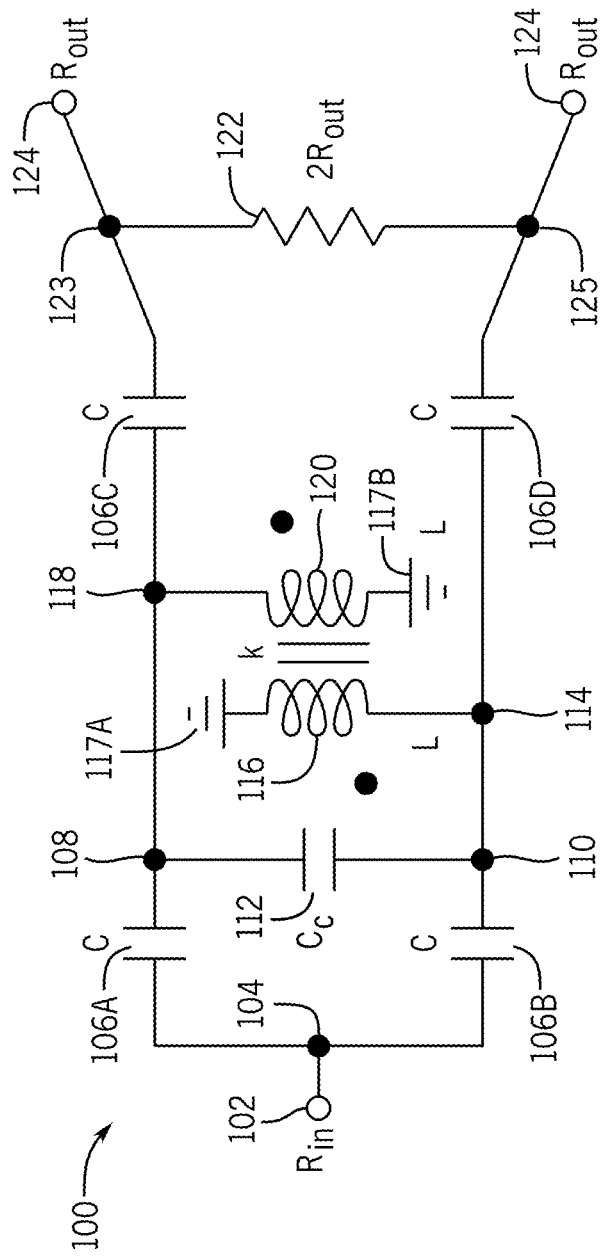
FIG. 5 is a circuit diagram of splitter/combiner circuitry disposed in a transceiver of the electronic device of FIG. 1, according to embodiments of the present disclosure.

With the foregoing in mind, FIG. 5 is a circuit diagram of splitter/combiner circuitry 100 disposed in the transceiver 30 of the electronic device of FIG. 1. When operating as the splitter 69, the splitter/combiner circuitry 100 may include an input 102 (e.g., an input terminal) and outputs 124 (e.g., output terminals), where the splitter/combiner circuitry 100 splits a signal (e.g., received from the power amplifier 66 of the transmitter 52) at the input 102 into multiple signals at the outputs 124. In additional or alternative embodiments, the splitter/combiner circuitry 100 may operate as the combiner 85, where the outputs 124 may function as inputs and the input 102 may function as an output. In such embodiments, the splitter/combiner circuitry 100 combines multiple signals (e.g., received from the low noise amplifier 82 of the receiver 54) at the outputs 124 into a single signal at the input 102. It should be noted that the input 102 may be associated with a resistance $R_{in}$. That is, the resistance of one or more components coupled to the input 102 may be represented by resistance $R_{in}$. In some embodiments, the resistance $R_{in}$ may include 500 ohms (Ω) or less, 200Ω or less, 100Ω or less, and so on, such as 50Ω.

The input 102 may be coupled to a capacitive element 106A and a capacitive element 106B at node 104. The capacitive elements 106A and 106B may be coupled in such a way that the capacitive elements 106A and 106B are each on separate circuit branches, where the separate branches may split an incoming signal from the amplifier 82 received at the input 102. It should be noted that the capacitive elements 106A and 106B may have identical or similar capacitance C. In some embodiments, the capacitance C may include 500 Farads (F) or less, 400 F or less, 300 F or less, 200 F or less, 100 F or less, and so on, such as 80 F. The capacitive element 106A may be coupled to a capacitive element 112 via a node 108. Additionally, the capacitive element 106B may be coupled to the capacitive element 112 at a node 110. It should be noted that the capacitive element 112 may have the capacitance $C_c$. In some embodiments, the capacitance $C_c$ may include between 500 F or less, 400 F or less, 300 F or less, 200 F or less, 100 F or less, and so on, such as 55 F. It should be noted that the capacitive element 112 may be disposed in the splitter/combiner circuitry 100 to compensate for inductively coupling by a first coupled inductive element 116 and a second coupled inductive element 120. That is, the first coupled inductive element 116 and the second coupled inductive element 120 may be disposed such that, in operation, they are inductively coupled together. For example, the first coupled inductive element 116 and the second coupled inductive element 120 may be physically close to one another (e.g., such that running a current through one of the inductive elements 116, 120 causes current to be inductively generated in the other 120, 166). That is, the first coupled inductive element 116 and the second coupled inductive element 120 may occupy a smaller surface area when coupled together inductively compared to two non-coupled inductive elements (e.g., two inductive elements that are not inductively coupled) disposed on separate branches in the splitter/combiner circuitry 100.

The first coupled inductive element 116 may be coupled to a ground 117A and the second coupled inductive element 120 may be coupled to a ground 117B. When coupling inductive elements (e.g., two or more inductors) together, the amount of inductive coupling that exists between the inductive elements may be expressed as a coupling factor k, which is a value between 0 and 1. It should be understood that k=0 indicates no inductive coupling and that k=1 indicates maximum inductive element coupling. The first coupled inductive element 116 and the second coupled inductive element 120 may have a coupling factor k between 0.1 and 0.9, between 0.2 and 0.8, between 0.3 and 0.7, between 0.4 and 0.6, and so on, such as 0.4.

Furthermore, a capacitive element 106C may be coupled to the node 118 and a capacitive element 106D may be coupled to the node 114. Similar to the capacitive elements 106A and 106B, the capacitive elements 106C and 106D may have the capacitance C. The capacitive element 106C may be coupled to a resistive element 122 and an output 124 (e.g., two output terminals) at a node 123. Additionally, the capacitive element 106D may be coupled to the resistive element 122 and the output 124 at a node 125. Furthermore, the resistive element 122 may be coupled between each output 124. The output 124 may be coupled to one or more components in the transceiver 30 and may supply the one or more components with the split output signal. In some embodiments, the output 124 may operate as an input when the splitter/combiner circuitry 100 is operating as the combiner and the input 102 may operate as an output when the splitter/combiner circuitry 100 is operating as the combiner. It should be noted that the output 124 may be associated with a resistance $R_{out}$. That is, the resistances of one or more components (e.g., a load) coupled to the output 124 may be represented by resistance $R_{out}$. In some embodiments, the resistance $R_{out}$ may include 500Ω or less, 200Ω or less, 100Ω or less, and so on, such as 50Ω. Furthermore, the resistance of the resistive element 122 may have a resistance that is double the resistance $R_{out}$.

Capacitances of the capacitive elements 106 may be determined by Equation 1 below:

$$C = \frac{1}{z_0 \omega_0} \qquad \text{(Equation 1)}$$

That is, the capacitances of the capacitive elements 106 may be dependent on $\omega_0$, where $\omega_0$ may be determined by $2\pi f_0$ ($f_0$ being a target frequency of the incoming signal). The capacitances of the capacitive elements 106 may be dependent on $z_0$ (impedance of the one or more components coupled to the splitter/combiner circuitry 100), where $z_0$ is determined by Equation 2 below:

$$z_0 = 2\sqrt{R_{out} R_{in}} \qquad \text{(Equation 2)}$$

Furthermore, the capacitance of capacitive element 112 may be determined by Equation 3 below:

$$C_C = C * \frac{k}{(1-k)} \qquad \text{(Equation 3)}$$

The inductance of the first coupled inductive element 116 and the second coupled inductive element 120 may be determined by Equation 4 below:

$$L = \frac{z_0}{\omega_0(1+k)} \qquad \text{(Equation 4)}$$

As discussed above, the inductive coupling of the first coupled inductive element 116 and the second coupled inductive element 120 may allow for the inductive elements occupy a smaller surface area compared to if each inductive element was individually situated without being inductively coupled (e.g., such that the inductive elements are not inductively coupled). Furthermore, the capacitive element 112 may have particular values to compensate for the coupled inductive elements and the capacitive element 112 position in the circuit may allow for particular circuit configurations when creating the splitter/combiner circuitry 100 circuit, as defined by Equations 1 and 3 above. As such, additional configurations relating to the placement of a compensating capacitive element (e.g., the capacitive element 112) may be used, where the placement of the compensating capacitive element may affect the capacitances of the additional capacitive elements in the circuit. That is, a different topology may be achieved with different placements of the compensating capacitive element.

Figure 6:
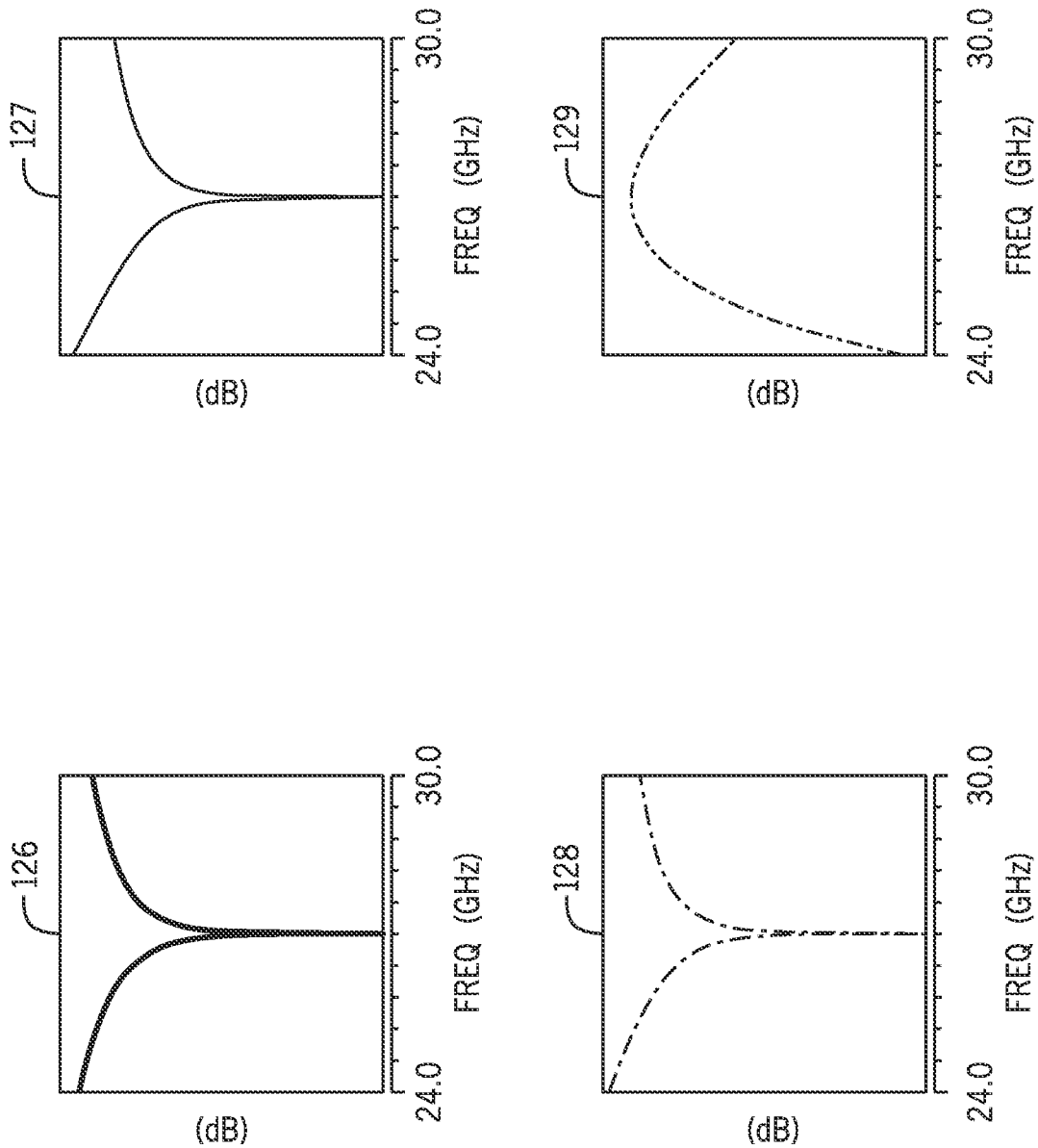
FIG. 6 are graphs demonstrating performance of the splitter/combiner circuitry of FIG. 5, according to embodiments of the present disclosure.

With the foregoing in mind, FIG. 6 illustrates graphs 126-129 demonstrating performance of the splitter/combiner circuitry 100 of FIG. 5. In the graphs 126-129, performance of the splitter/combiner circuitry 100 with the coupled inductive elements 116, 120 is demonstrated with respect to a desired (target) frequency of 27 gigahertz (GHz), where a coupling factor k between the coupled inductors may be equal to 0.4. In additional or alternative embodiments, the desired frequency may include between 20 GHz or greater, between 24 GHz and 30 GHz, any suitable mmWave frequency, and so on. The graphs 126-129 each have a horizontal or x-axis representing frequency in GHz and a vertical or y-axis representing power in decibels (dB). Furthermore, each graph 126-129 may include a solid line, where the solid line indicates the performance of the splitter/combiner circuitry 100 with the modification of the coupled inductors.

The graph 126 illustrates reflected signal power at the input 102 of the splitter/combiner circuitry 100 (e.g., $S_{11}$). Under ideal conditions, all signal power should be transmitted from the input 102 to the outputs 124, 125 of the splitter/combiner circuitry 100 equally. As such, it may be desired to decrease or minimize reflected signal power at the input 102. As illustrated, at the desired frequency of 27 GHz, there is a significant decreased or minimum power, indicating that very little to no signal power is reflected at the input 102, as desired. The graph 127 illustrates reflected signal power at each output 124, 125 of the splitter/combiner circuitry 100 (e.g., $S_{22}$ and $S_{33}$). As with the input 102, it may be desired to decrease or minimize reflected signal power at each output 124, 125. As illustrated, at the desired frequency of 27 GHz, there is a significant decreased or minimum power, indicating that very little to no signal power is reflected at each output 124, 125, as desired. It should be noted that the graphs 126, 127 each illustrate input matching, or matching impedances between the input 102 and the outputs 124, 125 of the network when the load is matched to the impedance of the splitter/combiner circuitry 100.

The graph 128 illustrates the transmission of signal power (e.g., $S_{32}$) between the outputs 124, 125. It may be desired to ensure transmitted signal power from the input 102 is distributed equally between the outputs 124, 125 to provide equal power to the one or more components in the transceiver 30 coupled to the splitter/combiner circuitry 100. As illustrated, at the desired frequency of 27 GHz, there is a significant decreased or minimum power, indicating that very little to no signal power is reflected at between the outputs 124, 125, as desired.

The graph 129 illustrates forward transmission of signal power (e.g., $S_{31}$) between the input 102 and the outputs 124, 125. As noted above, it may be desired to increase or maximize transmitted signal power from the input 102 to the outputs 124, 125 of the splitter/combiner circuitry 100. As illustrated, at the desired frequency of 27 GHz, there is a significant increased or maximum power transmitted from the input 102 to the outputs 124, 125, as desired. In some embodiments, the transmitted signal power at the desired frequency may be approximately −3 dB.

Figure 7:
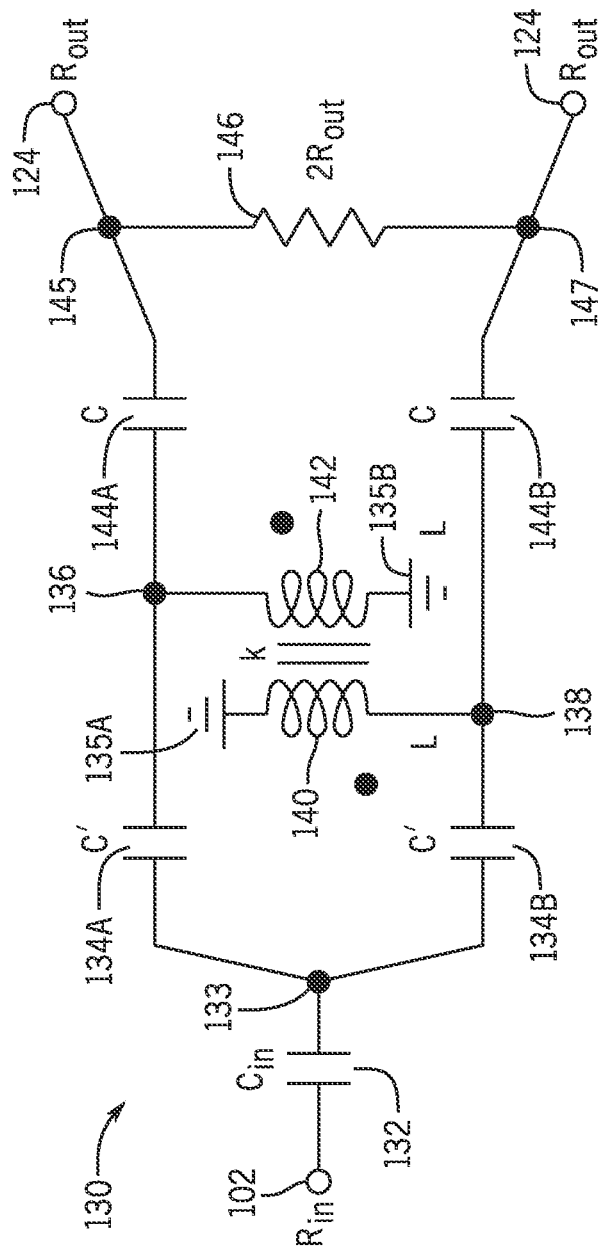
FIG. 7 is a circuit diagram of an alternative splitter/combiner circuitry disposed in the transceiver of the electronic device of FIG. 1, according to embodiments of the present disclosure.

With the foregoing in mind, FIG. 7 a circuit diagram of an alternative splitter/combiner circuitry 130 disposed in the transceiver 30 of the electronic device of FIG. 1. When operating as the splitter 69, the splitter/combiner circuitry 130 may include the input 102 (e.g., an input terminal) and outputs 124 (e.g., output terminals), where the splitter/combiner circuitry 130 splits a signal (e.g., received from the power amplifier 66 of the transceiver 30) at the input 102 into multiple signals at the outputs 124. As with the splitter/combiner circuitry 130 of FIG. 5, in additional or alternative embodiments, the splitter/combiner circuitry 130 may operate as the combiner 85, where the outputs 124 may function as inputs and the input 102 may function as an output. It should be noted that the input 102 may be associated with a resistance $R_{in}$. That is, the resistances of one or more components coupled to the input 102 may be represented by resistance $R_{in}$. In some embodiments, the resistance $R_{in}$ may include 500Ω or less, 200Ω or less, 100Ω or less, and so on, such as 50Ω.

The input 102 may be coupled to a capacitive element 132. Similar to the capacitive element 112, the capacitive element 132 may be consider a compensating capacitive element for the coupling of inductive elements. It should be noted that the capacitive element 132 may have a capacitance $C_{in}$. In some embodiments, the capacitances $C_{in}$ may include 700 F or less, 600 F or less, 500 F or less, 400 F or less, 300 F or less, and so on, such as 290 F. The capacitive element 132 may be coupled to a capacitive element 134A and a capacitive element 134B via a node 133. The capacitive elements 134A and 134B are each on separate branches, where the separate branches may split an incoming signal from the amplifier 82 received at the input 102 and transmitted through the capacitive element 132. It should be noted that the capacitive elements 134A and 134B (collectively 134) may have identical or similar capacitances C'. In some embodiments, the capacitances C' may include 600 F or less, 500 F or less, 400 F or less, 300 F or less, 200 F or less, and so on, such as 195 F. The capacitive element 134A may be coupled to a third coupled inductive element 140 via a node 138 and the capacitive element 134 may be coupled to a fourth coupled inductive element 142 via a node 136. Similar to the first coupled inductive element 116 and the second coupled inductive element 120, the third coupled inductive element 140 and the fourth coupled inductive element 142 may be inductively coupled together such that the third coupled inductive element 140 and the fourth coupled inductive element 142 are physically close to one another (e.g., such that running a current through one of the inductive elements 116, 120 causes current to be inductively generated in the other 120, 166). That is, the third coupled inductive element 140 and the fourth coupled inductive element 142 may occupy a smaller surface area when coupled together inductively compared to two non-coupled inductive elements (e.g., two inductive elements that are not inductively coupled) disposed on separate branches in the splitter/combiner circuitry 130.

When coupling inductive elements (e.g., two or more inductors) together, the amount of inductive coupling that exists between the inductive elements is expressed as a coupling factor k, which is a value between 0 and 1. It should be understood that k=0 indicates no inductive coupling and that k=1 indicates maximum inductive element coupling. The third coupled inductive element 140 and the fourth coupled inductive element 142 may have a coupling factor k between 0.1 and 0.9, between 0.2 and 0.8, between 0.3 and 0.7, between 0.4 and 0.6, and so on, such as 0.4. The third coupled inductive element 140 may be directly coupled to a ground connection 135A and the fourth coupled inductive element 142 may be directly coupled to a ground connection 135B.

The third coupled inductive element 140 may be coupled to a capacitive element 144A via the node 136 and the fourth coupled inductive element 142 may be coupled to a capacitive element 144B via the node 138. The capacitive elements 144A and 144B (collectively 144) may have identical or similar capacitances C. The capacitive element 144A may be coupled to a resistive element 146 and an output 124 via a node 145. Additionally, the capacitive element 144B may be coupled to the resistive element 146 and the output 124 via a node 147. Furthermore, the resistive element 146 may be coupled between each output 124. The output 124 may be coupled to one or more components in the transceiver 30 and may supply the one or more components with the split input signal. In some embodiments, the output 124 may operate as an input when the splitter/combiner circuitry 130 is operating as the combiner and the input 102 may operate as an output when the splitter/combiner circuitry 130 is operating as the combiner. It should be noted that the output 124 may be associated with a resistance $R_{out}$. That is, the resistances of one or more components (e.g., a load) coupled to the output 124 may be represented by resistance $R_{out}$. In some embodiments, the resistance $R_{out}$ may include 500Ω or less, 200Ω or less, 100Ω or less, and so on, such as 50Ω.

Capacitances of the capacitive elements 134 may be determined by Equation 5 below:

$$C' = \frac{1}{z_0 \omega_0} * \frac{1+k}{1-k} \qquad \text{(Equation 5)}$$

That is, the capacitances of the capacitive elements 134 may be dependent on $\omega_0$, where $\omega_0$ may be determined by $2\pi f_0$ ($f_0$ being a desired frequency of the incoming signal). The capacitance of the capacitive elements 134 may be dependent on $z_0$ (impedance of the one or more components coupled to the splitter/combiner circuitry 100), where $z_0$ is determined by the Equation 2 above. Furthermore, the capacitance of capacitive element 132 may be determined by Equation 6 below:

$$C_{in} = C * \frac{1+k}{k} \qquad \text{(Equation 6)}$$

The inductance of the third coupled inductive element 140 and the fourth coupled inductive element 142 may be determined by the Equation 3 above. It should be noted that the splitter/combiner circuitry 100 and the splitter/combiner circuitry 130 may operate as high-pass filters due to the arrangement of the one or more components in the splitter/ combiner circuitry 100 and the splitter/combiner circuitry 130. That is, the splitter/combiner circuitry 100 and the splitter/combiner circuitry 130 may reject lower frequencies and allow in higher frequencies when receiving signals, where $w_0$ corresponds to a high frequency band. Additionally or alternatively, the splitter/combiner circuitry 100 and the splitter/combiner circuitry 130 may operate as low-pass filters based on arrangement or configuration of the one or more components in the splitter/combiner circuitry 100 and the splitter/combiner circuitry 130. That is, the splitter/combiner circuitry 100 and the splitter/combiner circuitry 130 may reject higher frequencies and allow lower frequencies to pass through when receiving signals, where $w_0$ corresponds to a low frequency band.

Figure 8:
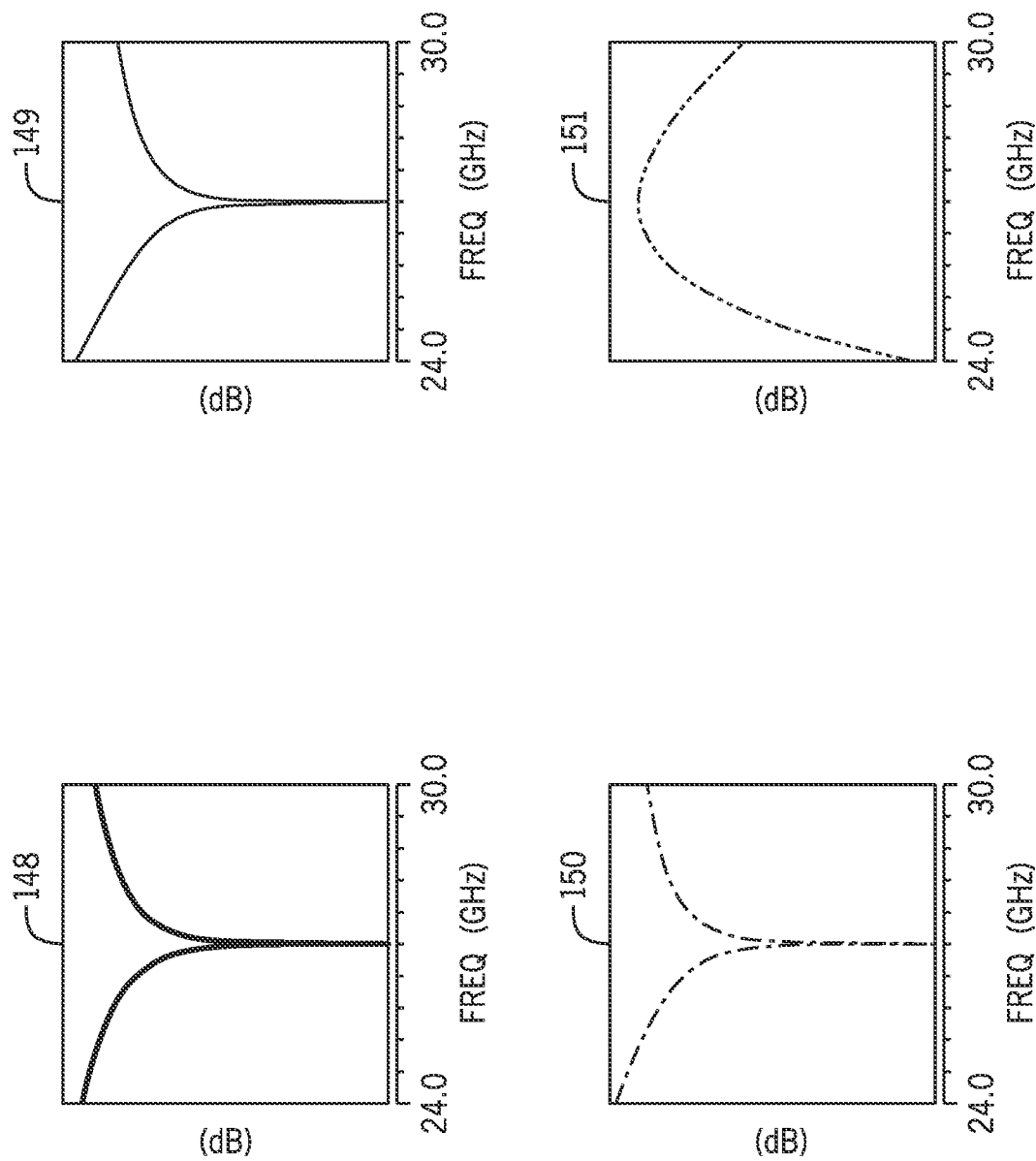
FIG. 8 are graphs demonstrating performance of the splitter/combiner circuitry of FIG. 7, according to embodiments of the present disclosure

With the foregoing in mind, FIG. 8 illustrates graphs 148-151 demonstrating performance of the splitter/combiner circuitry 130 of FIG. 7. In the graphs 148-151, performance of the splitter/combiner circuitry 130 with the coupled inductive elements 140, 142 is demonstrated with respect to a desired frequency of 27 gigahertz (GHz), where a coupling factor k between the coupled inductors may be equal to 4. In additional or alternative embodiments, the desired frequency may include between 20 GHz or greater, between 24 GHz and 30 GHz, any suitable mmWave frequency, and so on. The graphs 148-151 each have a horizontal or x-axis representing frequency in GHz and a vertical or y-axis representing power in decibels (dB). Furthermore, each graph 148-151 may include a solid line, where the solid line indicates the performance of the splitter/combiner circuitry 130 with the modification of the coupled inductors.

The graph 148 illustrates reflected signal power at the input 102 of the splitter/combiner circuitry 130 (e.g., $S_{11}$). Under ideal conditions, all signal power should be transmitted from the input 102 to the outputs 124, 125 of the splitter/combiner circuitry 130 equally. As such, it may be desired to decrease or minimize reflected signal power at the input 102. As illustrated, at the desired frequency of 27 GHz, there is a significant decreased or minimum power, indicating that very little to no signal power is reflected at the input 102, as desired. The graph 148 illustrates reflected signal power at each output 124, 125 of the splitter/combiner circuitry 130. As with the input 102, it may be desired to decrease or minimize reflected signal power at each output 124, 125. As illustrated, at the desired frequency of 27 GHz, there is a significant decreased or minimum power, indicating that very little to no signal power is reflected at each output 124, 125, as desired. The graph 149 illustrates reflected signal power at each output 124, 125 of the splitter/combiner circuitry 130 (e.g., $S_{22}$ and $S_{33}$). As with the input 102, it may be desired to decrease or minimize reflected signal power at each output 124, 125. As illustrated, at the desired frequency of 27 GHz, there is a significant decreased or minimum power, indicating that very little to no signal power is reflected at each output 124, 125, as desired. It should be noted that the graphs 148, 149 each illustrate input matching, or matching of impedances between the input 102 and the outputs 124, 125 of the network when the load is matched to the impedance of the splitter/combiner circuitry 130.

The graph 150 illustrates the transmission of signal power (e.g., $S_{32}$) between the outputs 124, 125. It may be desired to ensure transmitted signal power from the input 102 is distributed equally between the outputs 124, 125 to provide equal power to the one or more components in the transceiver 30 coupled to the splitter/combiner circuitry 130. As illustrated, at the desired frequency of 27 GHz, there is a significant decreased or minimum power, indicating that very little to no signal power is reflected at between the outputs 124, 125, as desired.

The graph 151 illustrates forward transmission of signal power (e.g., $S_{31}$) between the input 102 and the outputs 124, 125. As noted above, it may be desired to increase or maximize transmitted signal power from the input 102 to the outputs 124, 125 of the splitter/combiner circuitry 130. As illustrated, at the desired frequency of 27 GHz, there is a significant increased or maximum power transmitted from the input 102 to the outputs 124, 125, as desired. In some embodiments, the transmitted signal power at the desired frequency may be approximately −3 dB.

An additional consideration when shrinking or decreasing the surface area of circuitry is the introduction of parasitic capacitance. That is, parasitic capacitive is undesired capacitance that is generated by two or more components disposed physically close to one another. An electric field may form between two or more components and an electric charge may be stored due to the electrical field. Parasitic capacitance may form near the input and/or the output of a circuit, where it may interfere with incoming and/or outgoing signals.

Figure 9:
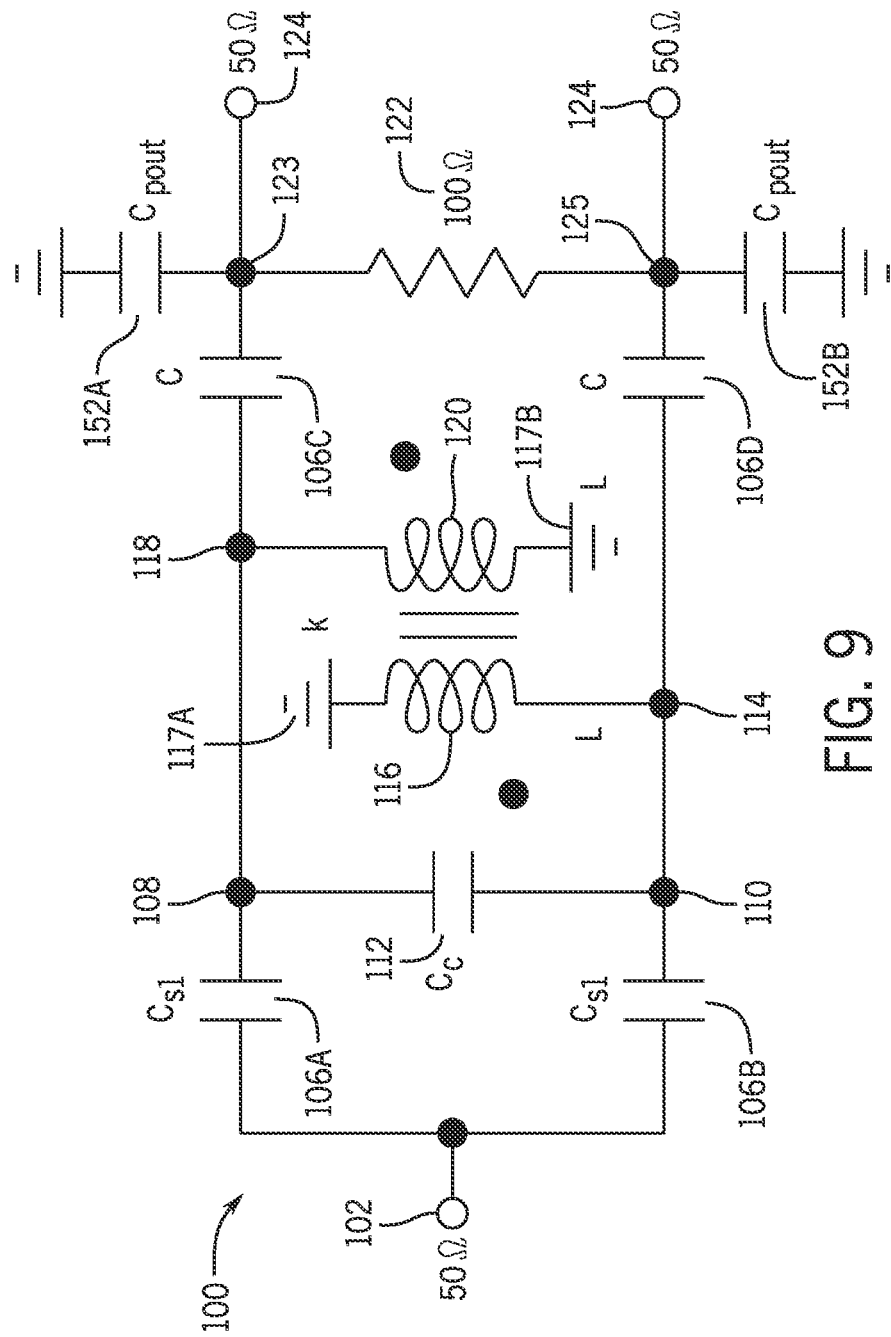
FIG. 9 is a circuit diagram of the splitter/combiner circuitry of FIG. 5 with one or more capacitive elements to absorb parasitic output capacitance, according to embodiments of the present disclosure.

With the foregoing in mind, FIG. 9 illustrates the splitter/combiner circuitry 100 of FIG. 5 with one or more capacitive elements to absorb parasitic output capacitance. A capacitive element 150A and a capacitive element 150B (collectively 150) may demonstrate the presence of parasitic output capacitance in the splitter/combiner circuitry 100. That is, the capacitive elements 150 may not be physical capacitive elements disposed in the splitter/combiner circuitry 100, but instead may each generate a capacitance $C_{pout}$ when the splitter/combiner circuitry 100 is in operation (e.g., receives a current or input signal).

Capacitances of the capacitive element 106A and/or the capacitive element 106B may be configured to absorb the parasitic output-capacitance $C_{pout}$ demonstrated by the capacitive elements 150. In particular, the capacitances $C_{s1}$ of the capacitive element 106A and the capacitive element 106B may be determined by Equation 7 below:

$$C_{s1} = \frac{1}{\omega\sqrt{50*100}} * \frac{1}{1+\sqrt{50*100}*C_{pout}\omega} \quad \text{(Equation 7)}$$

Figure 10B:
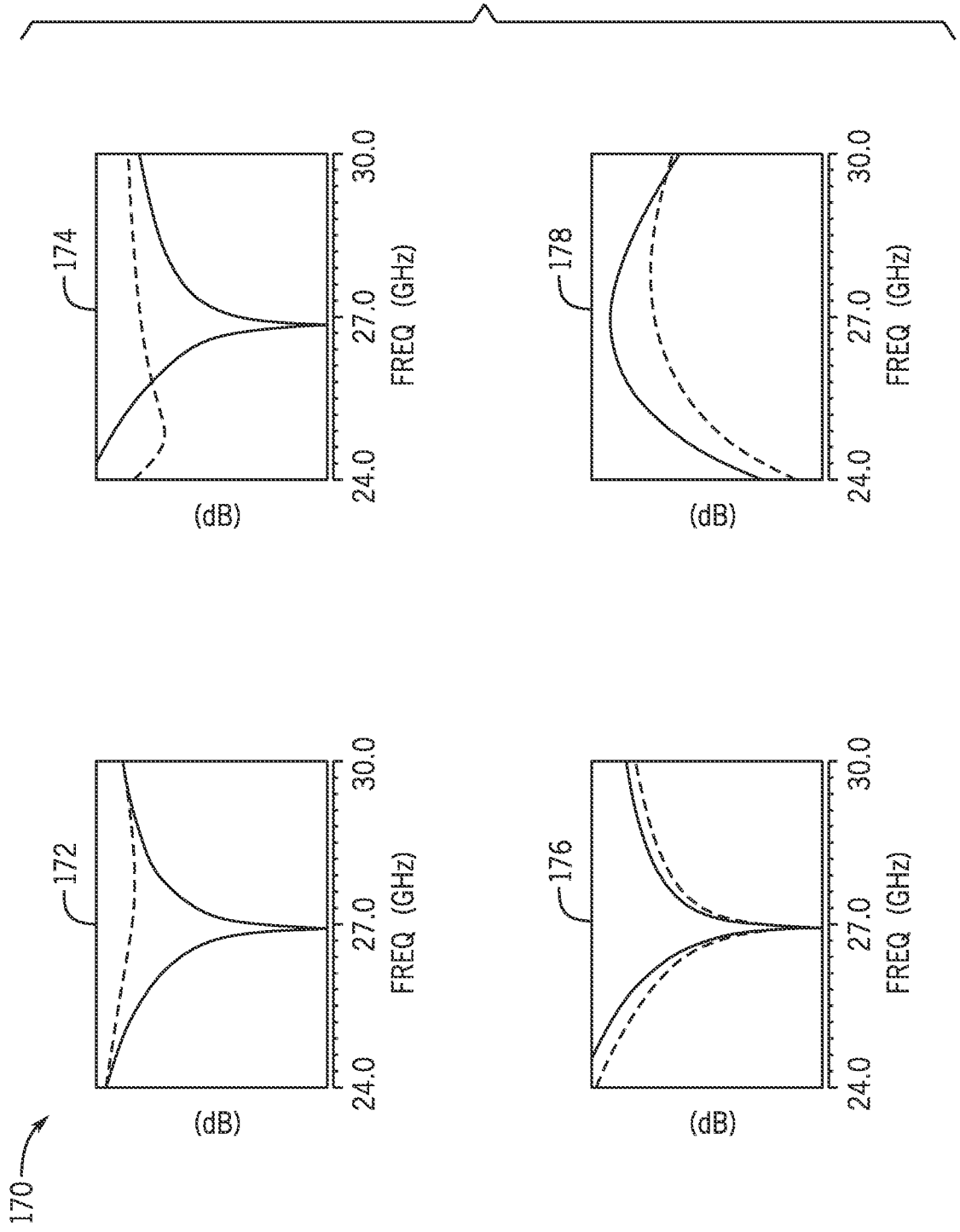

With the foregoing in mind, FIGS. 10A and 10B are graphs 160 and graphs 170 demonstrating performance of the splitter/combiner circuitry 100 of FIG. 5 with and without the capacitive elements 106A, 106B having the capacitances $C_{s1}$ configured to absorb the parasitic output capacitance. The graphs 160 may include graphs 162-168 and the graphs 170 may include graphs 172-178. The graphs 160 demonstrate performance of the splitter/combiner circuitry 100 with and without the capacitive elements 106A, 106B having the capacitances $C_{s1}$ configured to absorb the parasitic output capacitance $C_{pout}$ with respect to a desired frequency of 27 gigahertz (GHz), where a coupling factor k between the coupled inductors may be equal to 0. That is, there is no inductive coupling between the first coupled inductive element 116 and the second coupled inductive element 120. In additional or alternative embodiments, the desired frequency may include between 20 GHz or greater, between 24 GHz and 30 GHz, any suitable mmWave frequency, and so on. The graphs 162-168 each have a horizontal or x-axis representing frequency in GHz and a vertical or y-axis representing power in decibels (dB).

Furthermore, each graph 162-168 may include a solid line, where the solid line indicates the performance of the splitter/combiner circuitry 100 with the capacitive elements 106A, 106B having the capacitances $C_{s1}$ (as shown in FIG. 9) configured to absorb the parasitic output capacitance. Additionally, each graph 162-168 may include a dashed line, where the dashed line indicates the performance of the splitter/combiner circuitry 100 with the capacitive elements 106A, 106B having the capacitances C (as shown in FIG. 5) and not configured to absorb the parasitic output capacitance.

The graph 162 illustrates reflected signal power at the input 102 of the splitter/combiner circuitry 100 (e.g., $S_{11}$). Under ideal conditions, all signal power should be transmitted from the input 102 to the outputs 124, 125 of the splitter/combiner circuitry 100 equally. As such, it may be desired to decrease or minimize reflected signal power at the input 102. As illustrated, at the desired frequency of 27 GHz, there is a significant decreased or minimum power for the solid line indicating the performance of the splitter/combiner circuitry 100 with the capacitive elements 106A, 106B having the capacitances $C_{s1}$ (as shown in FIG. 9) configured to absorb the parasitic output capacitance, thus indicating that very little to no signal power is reflected at the input 102, as desired. However, for the dashed line indicating the performance of the splitter/combiner circuitry 100 with the capacitive elements 106A, 106B having the capacitances C (as shown in FIG. 5) that is not configured to absorb the parasitic output capacitance, the reflected signal power is much higher at the desired frequency of 27 GHz.

The graph 164 illustrates reflected signal power at each output 124, 125 of the splitter/combiner circuitry 100 (e.g., $S_{22}$ and $S_{33}$). As with the input 102, it may be desired to decrease or minimize reflected signal power at each output 124, 125. As illustrated, at the desired frequency of 27 GHz, there is a significant decreased or minimum power for the solid line indicating the performance of the splitter/combiner circuitry 100 with the capacitive elements 106A, 106B having the capacitances $C_{s1}$ (as shown in FIG. 9) configured to absorb the parasitic output capacitance, indicating that very little to no signal power is reflected at each output 124, 125, as desired. It should be noted that the graphs 162, 164 each illustrate input matching, or matching impedances between the input 102 and the outputs 124, 125 of the network when the load is matched to the impedance of the splitter/combiner circuitry 100. However, for the dashed line indicating the performance of the splitter/combiner circuitry 100 with the capacitive elements 106A, 106B having the capacitances C (as shown in FIG. 5) that is not configured to absorb the parasitic output capacitance, the reflected signal power is much higher at the desired frequency of 27 GHz.

The graph 166 illustrates the transmission of signal power (e.g., $S_{32}$) between the outputs 124, 125. It may be desired to ensure transmitted signal power from the input 102 is distributed equally between the outputs 124, 125 to provide equal power to the one or more components in the transceiver 30 coupled to the splitter/combiner circuitry 100. As illustrated, at the desired frequency of 27 GHz, there is a significant decreased or minimum power for both the splitter/combiner circuitry 100 with the capacitive elements 106A, 106B having the capacitances $C_{s1}$ and the splitter/combiner circuitry 100 with the capacitive elements 106A, 106B having the capacitances C, indicating that very little to no signal power is reflected at between the outputs 124, 125, as desired.

The graph 168 illustrates forward transmission of signal power (e.g., $S_{31}$) between the input 102 and the outputs 124, 125. As noted above, it may be desired to increase or maximize transmitted signal power from the input 102 to the outputs 124, 125 of the splitter/combiner circuitry 100. As illustrated, at the desired frequency of 27 GHz, there is a significant increased or maximum power transmitted from the input 102 to the outputs 124, 125 for the splitter/combiner circuitry 100 with the capacitive elements 106A, 106B having the capacitances $C_{s1}$ (as shown in FIG. 9) configured to absorb the parasitic output capacitance, as desired. The splitter/combiner circuitry 100 with the capacitive elements 106A, 106B having the capacitances C (as shown in FIG. 5) and not configured to absorb the parasitic output capacitance also has increased power transmitted from the input 102 to the outputs 124, 125 at the desired frequency of 27 GHz, though not as high as that of the splitter/combiner circuitry 100 with the capacitive elements 106A, 106B having the capacitances $C_{s1}$. In some embodiments, the transmitted signal power for the splitter/combiner circuitry 100 with the capacitive elements 106A, 106B having the capacitances $C_{s1}$ at the desired frequency may be approximately −3 dB.

The graphs 170 demonstrate performance of the splitter/combiner circuitry 100 with and without the capacitive elements 106A, 106B having the capacitance $C_{s1}$ configured to absorb the parasitic output capacitance $C_{pout}$ with respect to a desired frequency of 27 GHz, where a coupling factor k may be equal to 0.4. That is, there is inductive coupling between the first coupled inductive element 116 and the second coupled inductive element 120. In additional or alternative embodiments, the desired frequency may include between 20 GHz or greater, between 24 GHz and 30 GHz, any suitable mmWave frequency, and so on. The graphs 172-178 each have a horizontal or x-axis representing frequency in GHz and a vertical or y-axis representing power in decibels (dB). Furthermore, each graph 172-178 may include a solid line, where the solid line indicates the performance of the splitter/combiner circuitry 100 with the capacitive elements 106A, 106B having the capacitances $C_{s1}$ (as shown in FIG. 9) configured to absorb the parasitic output capacitance. Additionally, each graph 172-178 may include a dashed line, where the dashed line indicates the performance of the splitter/combiner circuitry 100 with the capacitive elements 106A, 106B having the capacitances C (as shown in FIG. 5) and not configured to absorb the parasitic output capacitance.

The graph 172 illustrates reflected signal power at the input 102 of the splitter/combiner circuitry 100 (e.g., $S_{11}$). Under ideal conditions, all signal power should be transmitted from the input 102 to the outputs 124, 125 of the splitter/combiner circuitry 100 equally. As such, it may be desired to decrease or minimize reflected signal power at the input 102. As illustrated, at the desired frequency of 27 GHz, there is a significant decreased or minimum power for the solid line indicating the performance of the splitter/combiner circuitry 100 with the capacitive elements 106A, 106B having the capacitances $C_{s1}$ (as shown in FIG. 9) configured to absorb the parasitic output capacitance, thus indicating that very little to no signal power is reflected at the input 102, as desired. However, for the dashed line indicating the performance of the splitter/combiner circuitry 100 with the capacitive elements 106A, 106B having the capacitances C (as shown in FIG. 5) that is not configured to absorb the parasitic output capacitance, the reflected signal power is much higher at the desired frequency of 27 GHz.

The graph 174 illustrates reflected signal power at each output 124, 125 of the splitter/combiner circuitry 100 (e.g., $S_{22}$ and $S_{33}$). As with the input 102, it may be desired to decrease or minimize reflected signal power at each output 124, 125. As illustrated, at the desired frequency of 27 GHz, there is a significant decreased or minimum power for the solid line indicating the performance of the splitter/combiner circuitry 100 with the capacitive elements 106A, 106B having the capacitances $C_{s1}$ (as shown in FIG. 9) configured to absorb the parasitic output capacitance, indicating that very little to no signal power is reflected at each output 124, 125, as desired. It should be noted that the graphs 172, 174 each illustrate input matching, or matching impedances between the input 102 and the outputs 124, 125 of the network when the load is matched to the impedance of the splitter/combiner circuitry 100. However, for the dashed line indicating the performance of the splitter/combiner circuitry 100 with the capacitive elements 106A, 106B having the capacitances C (as shown in FIG. 5) that is not configured to absorb the parasitic output capacitance, the reflected signal power is much higher at the desired frequency of 27 GHz.

The graph 176 illustrates the transmission of signal power (e.g., $S_{32}$) between the outputs 124, 125. It may be desired to ensure transmitted signal power from the input 102 is distributed equally between the outputs 124, 125 to provide equal power to the one or more components in the transceiver 30 coupled to the splitter/combiner circuitry 100. As illustrated, at the desired frequency of 27 GHz, there is a significant decreased or minimum power for both the splitter/combiner circuitry 100 with the capacitive elements 106A, 106B having the capacitances $C_{s1}$ and the splitter/combiner circuitry 100 with the capacitive elements 106A, 106B having the capacitances C, indicating that very little to no signal power is reflected at between the outputs 124, 125, as desired.

The graph 178 illustrates forward transmission of signal power (e.g., $S_{31}$) between the input 102 and the outputs 124, 125. As noted above, it may be desired to increase or maximize transmitted signal power from the input 102 to the outputs 124, 125 of the splitter/combiner circuitry 100. As illustrated, at the desired frequency of 27 GHz, there is a significant increased or maximum power transmitted from the input 102 to the outputs 124, 125 for the splitter/combiner circuitry 100 with the capacitive elements 106A, 106B having the capacitances $C_{s1}$ (as shown in FIG. 9) configured to absorb the parasitic output capacitance, as desired. The splitter/combiner circuitry 100 with the capacitive elements 106A, 106B having the capacitances C (as shown in FIG. 9) and not configured to absorb the parasitic output capacitance also has increased power transmitted from the input 102 to the outputs 124, 125 at the desired frequency of 27 GHz, though not as high as that of the splitter/combiner circuitry 100 with the capacitive elements 106A, 106B having the capacitances $C_{s1}$. In some embodiments, the transmitted signal power for the splitter/combiner circuitry 100 with the capacitive elements 106A, 106B having the capacitances $C_{s1}$ at the desired frequency may be approximately −3 dB.

Figure 11:
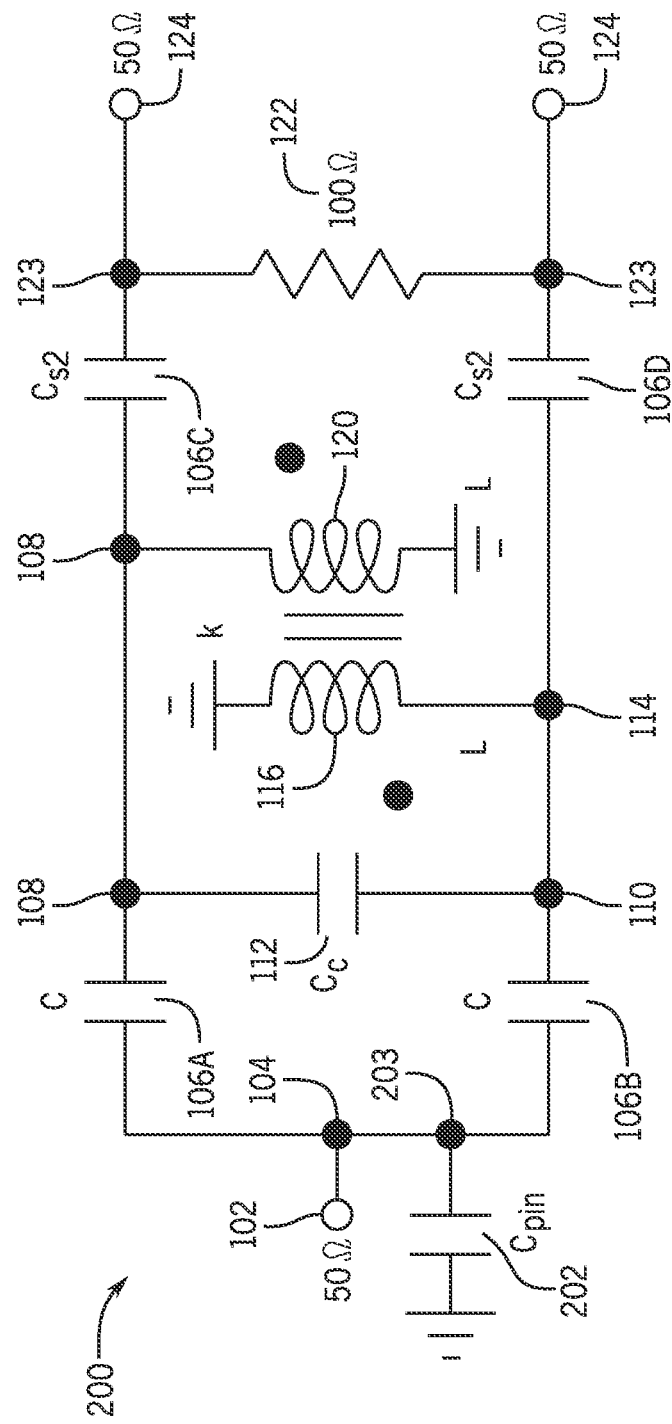
FIG. 11 is a circuit diagram of the splitter/combiner circuitry of FIG. 5 with one or more alternative capacitive elements to absorb parasitic input capacitance, according to embodiments of the present disclosure.

As discussed above, parasitic capacitive is undesired capacitance that is generated by two or more components disposed physically close to one another. With the foregoing in mind, FIG. 11 illustrates the splitter/combiner circuitry 100 of FIG. 5 with one or more capacitive elements 106C, 106D configured to absorb parasitic input capacitance. Similar to the capacitive elements 152 in FIG. 7, a capacitive element 202 may illustrate the presence of parasitic input capacitance in the splitter/combiner circuitry 100. That is, the parasitic capacitance at the input 102 of the splitter/combiner circuitry 100 may have a capacitance Cp.

The capacitive element 106C and the capacitive element 106D may be configured to absorb the parasitic input capacitance represented by the capacitive element 202. The values of the capacitive element 106C and the capacitive element 106D may be determined by Equation 8 below:

$$C_{s2} = \frac{1}{\omega\sqrt{50*100}} * \frac{1}{1+.5*\sqrt{50*100}*C_{pin}\omega} \quad \text{(Equation 8)}$$

In some embodiments, each of the capacitive elements 106 may be configured based on the Equation 7 and the Equation 8 to account for both the parasitic output capacitance and the parasitic input capacitance.

Figure 12A:
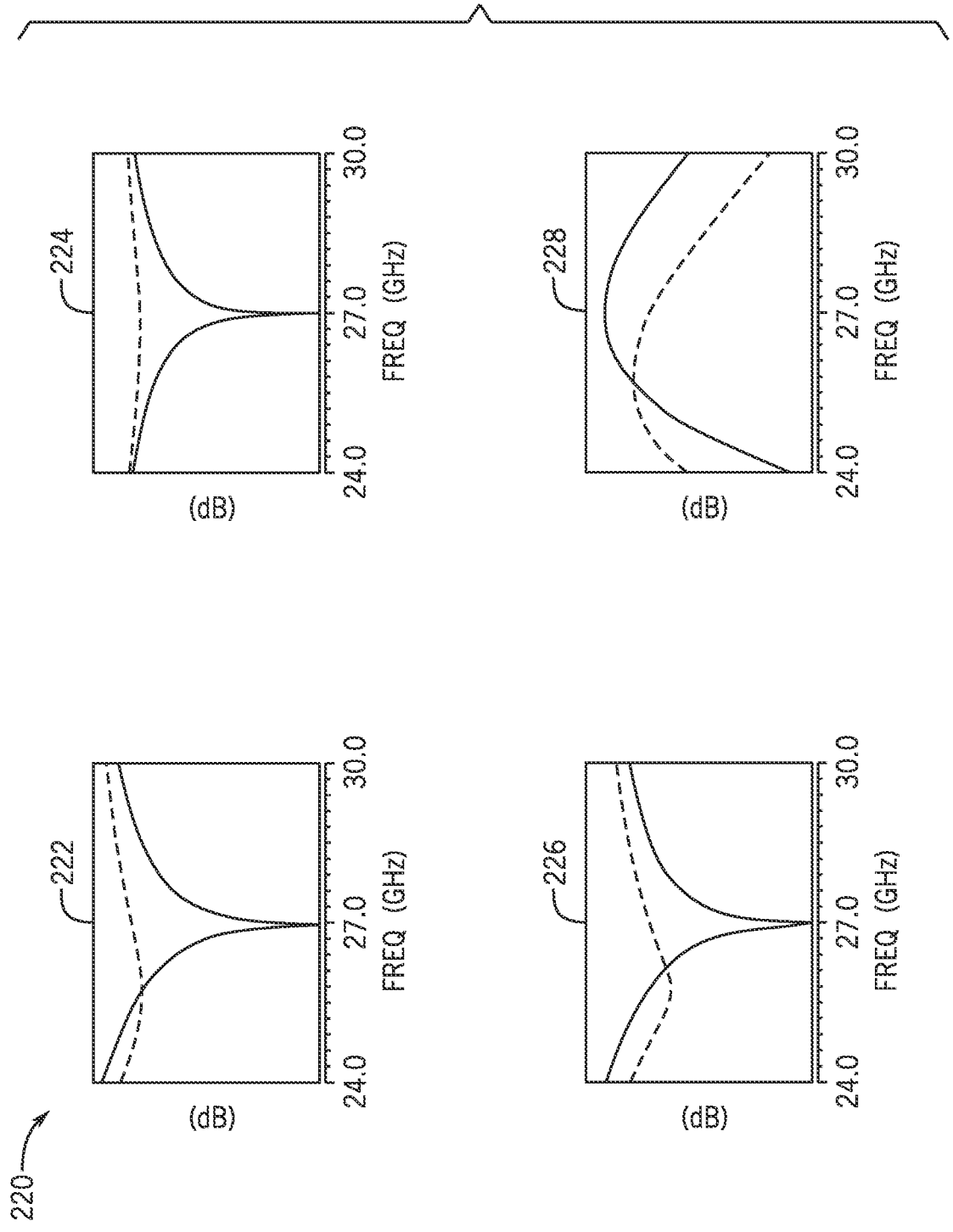
FIGS. 12A and 12B are graphs illustrating performance of the splitter/combiner circuitry of FIG. 5 with and without the one or more alternative capacitive elements of FIG. 11, according to embodiments of the present disclosure.
Figure 12B:
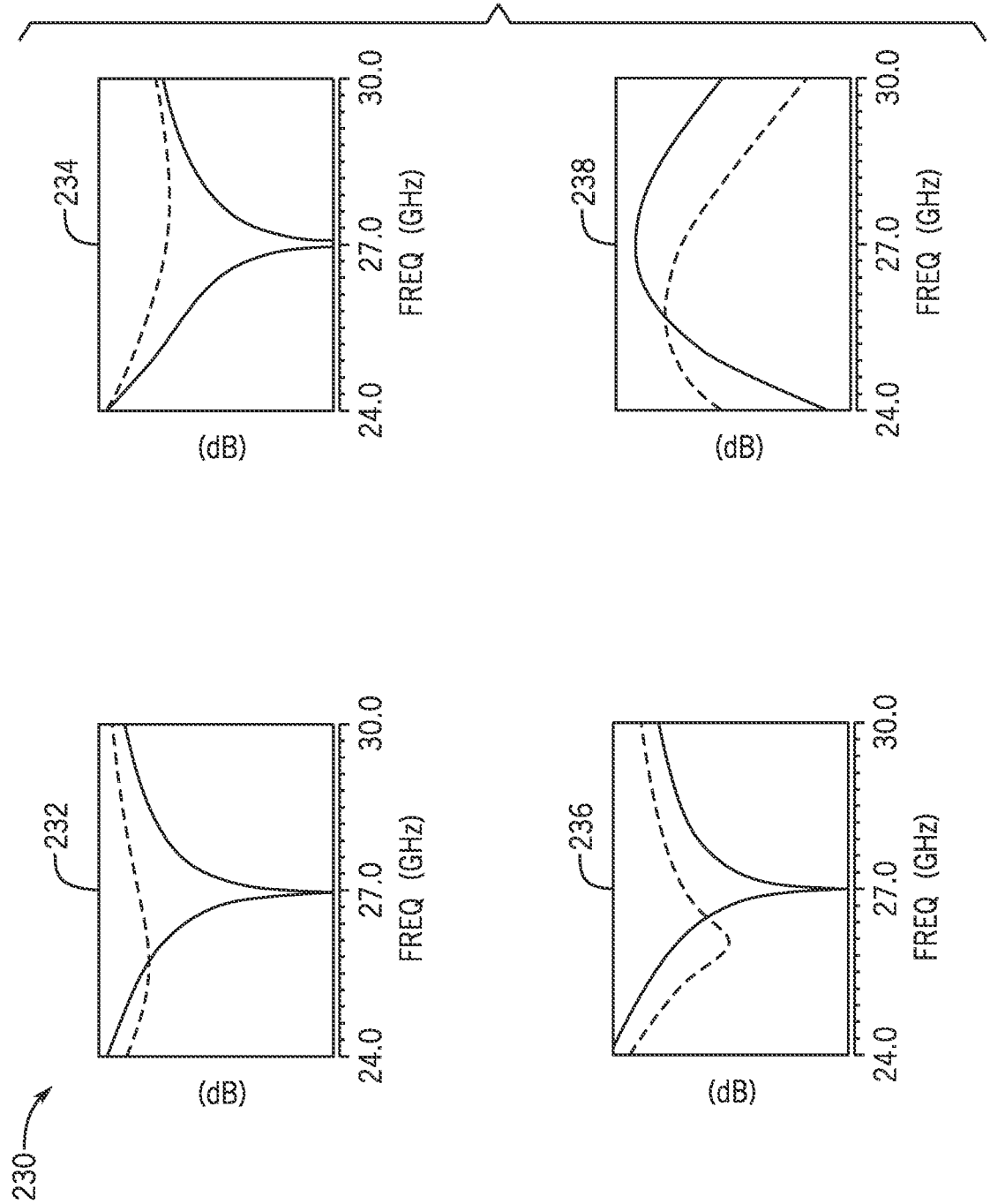

With the foregoing in mind, FIGS. 12A and 12B are graphs 220 and graphs 230 demonstrating performance of the splitter/combiner circuitry 100 of FIG. 5 with and without the capacitive elements 106C, 106D having the capacitances $C_{s2}$ configured to absorb the parasitic input capacitance. The graphs 220 may include graphs 222-228 and the graphs 230 may include graphs 232-238. The graphs 220 demonstrate performance of the splitter/combiner circuitry 100 with and without the capacitive elements 106C, 106D having the capacitances $C_{s2}$ configured to absorb the parasitic input capacitance $C_{pin}$ with respect to a desired frequency of 27 gigahertz (GHz), where a coupling factor k between the coupled inductors may be equal to 0. That is, there is no inductive coupling between the first coupled inductive element 116 and the second coupled inductive element 120. In additional or alternative embodiments, the desired frequency may include between 20 GHz or greater, between 24 GHz and 30 GHz, any suitable mmWave frequency, and so on. The graphs 222-228 each have a horizontal or x-axis representing frequency in GHz and a vertical or y-axis representing power in decibels (dB). Furthermore, each graph 222-228 may include a solid line, where the solid line indicates the performance of the splitter/combiner circuitry 100 with the capacitive elements 106C, 106D having the capacitances $C_{s2}$ (as shown in FIG. 11) configured to absorb the parasitic input capacitance. Additionally, each graph 222-228 may include a dashed line, where the dashed line indicates the performance of the splitter/combiner circuitry 100 with the capacitive elements 106C, 106D having the capacitances C (as shown in FIG. 5) and not configured to absorb the parasitic input capacitance.

The graph 222 illustrates reflected signal power at the input 102 of the splitter/combiner circuitry 100 (e.g., $S_{11}$). Under ideal conditions, all signal power should be transmitted from the input 102 to the outputs 124, 125 of the splitter/combiner circuitry 100 equally. As such, it may be desired to decrease or minimize reflected signal power at the input 102. As illustrated, at the desired frequency of 27 GHz, there is a significant decreased or minimum power for the solid line indicating the performance of the splitter/combiner circuitry 100 with the capacitive elements 106C, 106D having the capacitances $C_{s2}$ (as shown in FIG. 11) configured to absorb the parasitic input capacitance, thus indicating that very little to no signal power is reflected at the input 102, as desired. However, for the dashed line indicating the performance of the splitter/combiner circuitry 100 with the capacitive elements 106C, 106D having the capacitances C (as shown in FIG. 5) that is not configured to absorb the parasitic input capacitance, the reflected signal power is much higher at the desired frequency of 27 GHz.

The graph 224 illustrates reflected signal power at each output 124, 125 of the splitter/combiner circuitry 100 (e.g., $S_{22}$ and $S_{33}$). As with the input 102, it may be desired to decrease or minimize reflected signal power at each output 124, 125. As illustrated, at the desired frequency of 27 GHz, there is a significant decreased or minimum power for the solid line indicating the performance of the splitter/combiner circuitry 100 with the capacitive elements 106C, 106D having the capacitances $C_{s2}$ (as shown in FIG. 11) configured to absorb the parasitic output capacitance, indicating that very little to no signal power is reflected at each output 124, 125, as desired. It should be noted that the graphs 222, 224 each illustrate input matching, or matching impedances between the input 102 and the outputs 124, 125 of the network when the load is matched to the impedance of the splitter/combiner circuitry 100. However, for the dashed line indicating the performance of the splitter/combiner circuitry 100 with the capacitive elements 106C, 106D having the capacitances C (as shown in FIG. 5) that is not configured to absorb the parasitic input capacitance, the reflected signal power is much higher at the desired frequency of 27 GHz.

The graph 226 illustrates the transmission of signal power (e.g., $S_{32}$) between the outputs 124, 125. It may be desired to ensure transmitted signal power from the input 102 is distributed equally between the outputs 124, 125 to provide equal power to the one or more components in the transceiver 30 coupled to the splitter/combiner circuitry 100. As illustrated, at the desired frequency of 27 GHz, there is a significant decreased or minimum power for the solid line indicating the performance of the splitter/combiner circuitry 100 with the capacitive elements 106C, 106D having the capacitances $C_s$ (as shown in FIG. 9) configured to absorb the parasitic output capacitance, indicating that very little to no signal power is reflected at between the outputs 124, 125, as desired. However, for the dashed line indicating the performance of the splitter/combiner circuitry 100 with the capacitive elements 106C, 106D having the capacitances C (as shown in FIG. 5) that is not configured to absorb the parasitic input capacitance, the reflected signal power is much higher at the desired frequency of 27 GHz.

The graph 228 illustrates forward transmission of signal power (e.g., $S_{31}$) between the input 102 and the outputs 124, 125. As noted above, it may be desired to increase or maximize transmitted signal power from the input 102 to the outputs 124, 125 of the splitter/combiner circuitry 100. As illustrated, at the desired frequency of 27 GHz, there is a significant increased or maximum power transmitted from the input 102 to the outputs 124, 125 for the splitter/combiner circuitry 100 with the capacitive elements 106C, 106D having the capacitances $C_{s2}$ (as shown in FIG. 11) configured to absorb the parasitic input capacitance, as desired. The splitter/combiner circuitry 100 with the capacitive elements 106C, 106D having the capacitances C (as shown in FIG. 5) and not configured to absorb the parasitic input capacitance also has increased power transmitted from the input 102 to the outputs 124, 125, though not as high as that of the splitter/combiner circuitry 100 with the capacitive elements 106C, 106D having the capacitances $C_{s2}$, and not at the desired frequency of 27 GHz. In some embodiments, the transmitted signal power or the splitter/combiner circuitry 100 with the capacitive elements 106C, 106D having the capacitances $C_{s2}$ at the desired frequency may be approximately −3 dB.

The graphs 230 demonstrate performance of the splitter/combiner circuitry 100 with and without the capacitive elements 106C, 106D having the capacitances $C_{s2}$ configured to absorb the parasitic input capacitance $C_{pin}$ with respect to a desired frequency of 27 gigahertz (GHz), where a coupling factor k may be equal to 0.4. That is, there is inductive coupling between the first coupled inductive element 116 and the second coupled inductive element 120. In additional or alternative embodiments, the desired frequency may include between 20 GHz or greater, between 24 GHz and 30 GHz, any suitable mmWave frequency, and so on. The graphs 232-238 each have a horizontal or x-axis representing frequency in GHz and a vertical or y-axis representing power in decibels (dB). Furthermore, each graph 232-238 may include a solid line, where the solid line indicates the performance of the splitter/combiner circuitry 100 with the capacitive elements 106C, 106D having the capacitances $C_{s2}$ (as shown in FIG. 11) configured to absorb the parasitic input capacitance. Additionally, each graph 232-238 may include a dashed line, where the dashed line indicates the performance of the splitter/combiner circuitry 100 with the capacitive elements 106C, 106D having the capacitances C (as shown in FIG. 5) and not configured to absorb the parasitic input capacitance.

The graph 232 illustrates reflected signal power at the input 102 of the splitter/combiner circuitry 100 (e.g., $S_{11}$). Under ideal conditions, all signal power should be transmitted from the input 102 to the outputs 124, 125 of the splitter/combiner circuitry 100 equally. As such, it may be desired to decrease or minimize reflected signal power at the input 102. As illustrated, at the desired frequency of 27 GHz, there is a significant decreased or minimum power for the solid line indicating the performance of the splitter/combiner circuitry 100 with the capacitive elements 106C, 106D having the capacitances $C_{s2}$ (as shown in FIG. 11) configured to absorb the parasitic input capacitance, thus indicating that very little to no signal power is reflected at the input 102, as desired. However, for the dashed line indicating the performance of the splitter/combiner circuitry 100 with the capacitive elements 106C, 106D having the capacitances C (as shown in FIG. 5) that is not configured to absorb the parasitic input capacitance, the reflected signal power is much higher at the desired frequency of 27 GHz.

The graph 234 illustrates reflected signal power at each output 124, 125 of the splitter/combiner circuitry 100 (e.g., $S_{22}$ and $S_{33}$). As with the input 102, it may be desired to decrease or minimize reflected signal power at each output 124, 125. As illustrated, at the desired frequency of 27 GHz, there is a significant decreased or minimum power, indicating that very little to no signal power is reflected at each output 124, 125, as desired. It should be noted that the graphs 232, 234 each illustrate input matching, or matching impedances between the input 102 and the outputs 124, 125 of the network when the load is matched to the impedance of the splitter/combiner circuitry 100. However, for the dashed line indicating the performance of the splitter/combiner circuitry 100 with the capacitive elements 106C, 106D having the capacitances C (as shown in FIG. 5) that is not configured to absorb the parasitic input capacitance, the reflected signal power is much higher at the desired frequency of 27 GHz.

The graph 236 illustrates the transmission of signal power (e.g., $S_{32}$) between the outputs 124, 125. It may be desired to ensure transmitted signal power from the input 102 is distributed equally between the outputs 124, 125 to provide equal power to the one or more components in the transceiver 30 coupled to the splitter/combiner circuitry 100. As illustrated, at the desired frequency of 27 GHz, there is a significant decreased or minimum power for the solid line indicating the performance of the splitter/combiner circuitry 100 with the capacitive elements 106C, 106D having the capacitances $C_{s2}$ (as shown in FIG. 9) configured to absorb the parasitic output capacitance, indicating that very little to no signal power is reflected at between the outputs 124, 125, as desired. However, for the dashed line indicating the performance of the splitter/combiner circuitry 100 with the capacitive elements 106C, 106D having the capacitances C (as shown in FIG. 5) that is not configured to absorb the parasitic input capacitance, the reflected signal power is much higher at the desired frequency of 27 GHz.

The graph 238 illustrates forward transmission of signal power (e.g., $S_{31}$) between the input 102 and the outputs 124, 125. As noted above, it may be desired to increase or maximize transmitted signal power from the input 102 to the outputs 124, 125 of the splitter/combiner circuitry 100. As illustrated, at the desired frequency of 27 GHz, there is a significant increased or maximum power transmitted from the input 102 to the outputs 124, 125 for the splitter/combiner circuitry 100 with the capacitive elements 106C, 106D having the capacitances $C_{s2}$ (as shown in FIG. 11) configured to absorb the parasitic input capacitance, as desired. The splitter/combiner circuitry 100 with the capacitive elements 106C, 106D having the capacitances C (as shown in FIG. 5) and not configured to absorb the parasitic input capacitance also has increased power transmitted from the input 102 to the outputs 124, 125, though not as high as that of the splitter/combiner circuitry 100 with the capacitive elements 106C, 106D having the capacitances $C_{s2}$, and not at the desired frequency of 27 GHz. In some embodiments, the transmitted signal power or the splitter/combiner circuitry 100 with the capacitive elements 106C, 106D having the capacitances $C_{s2}$ at the desired frequency may be approximately −3 dB.

Figure 13:
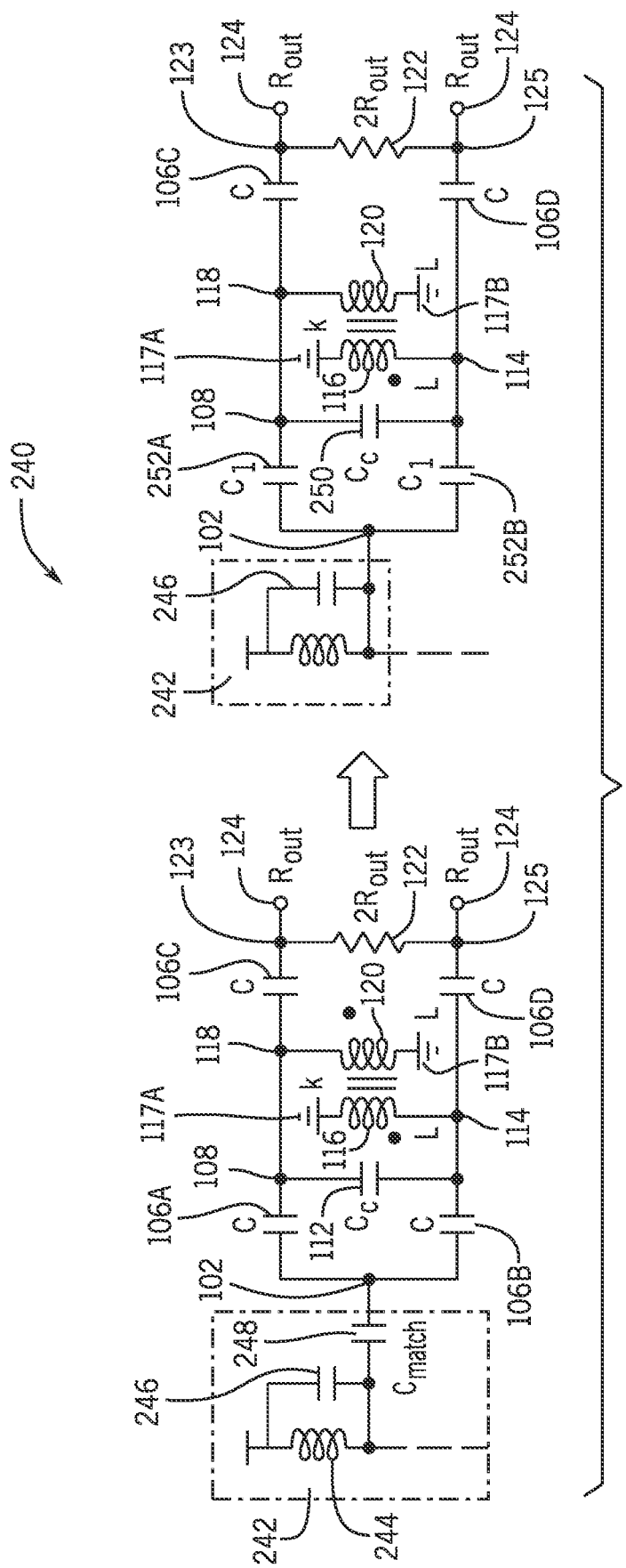
FIG. 13 is a circuit diagram of the splitter/combiner circuitry of FIG. 5 combined with one or more components of an output-matching circuit, according to embodiments of the present disclosure.

As discussed above, the splitter/combiner circuitry 100 may receive signals from the amplifier 66 and split the signals to facilitate beam-forming and transmission when operating as a splitter 69. In order to ensure proper beam-forming and transmission, the amplifier 66 may use an output-matching circuit to match or correlate the impedance of the amplifier 66 to that of the splitter/combiner circuitry 100. In some cases, the output-matching circuit may introduce additional surface area and/or components into the transceiver 30 that may increase the size and/or complexity of the transceiver 30. With the foregoing in mind, FIG. 13 is a circuit diagram 240 of the splitter/combiner circuitry 100 of FIG. 5 combined with the one or more components of an output-matching circuit 242.

The output-matching circuit 242 may include an inductive element 244 coupled in parallel with a capacitive element 246. The output-matching circuit 242 may include a capacitive element 248 coupled in series to the parallel arrangement of the inductive element 244 and the capacitive element 246. The capacitive element 248 may have a capacitance $C_{match}$ to facilitate output-matching of the amplifier 82 and the splitter/combiner circuitry 100.

Due to the configuration of the components in the splitter/combiner circuitry 100, the capacitive element 248 and the capacitive element 112 may be combined together and disposed as a capacitive element 250 in the splitter/combiner circuitry 100. That is, the capacitance of the capacitive element 112 may be adjusted to the capacitance determined by Equation 9 below:

$$C'_c = C_c + C * \frac{C}{2C + C_{match}} \qquad \text{(Equation 9)}$$

Furthermore, capacitive elements 252A, 252B (collectively 252) may replace capacitive elements 106A, 106B to compensate for the capacitance of the capacitive element 250. The capacitance of the capacitive elements 252 may be determined by Equation 10 below:

$$C_1 = \frac{C * C_{match}}{C - C_{match}} \qquad \text{(Equation 10)}$$

As such, combining the components of the output-matching circuit 242 may reduce the surface area and/or the complexity of the transceiver 30 when compared to having a separate output-matching circuit 248 disposed in the transceiver 30.

Figure 14:
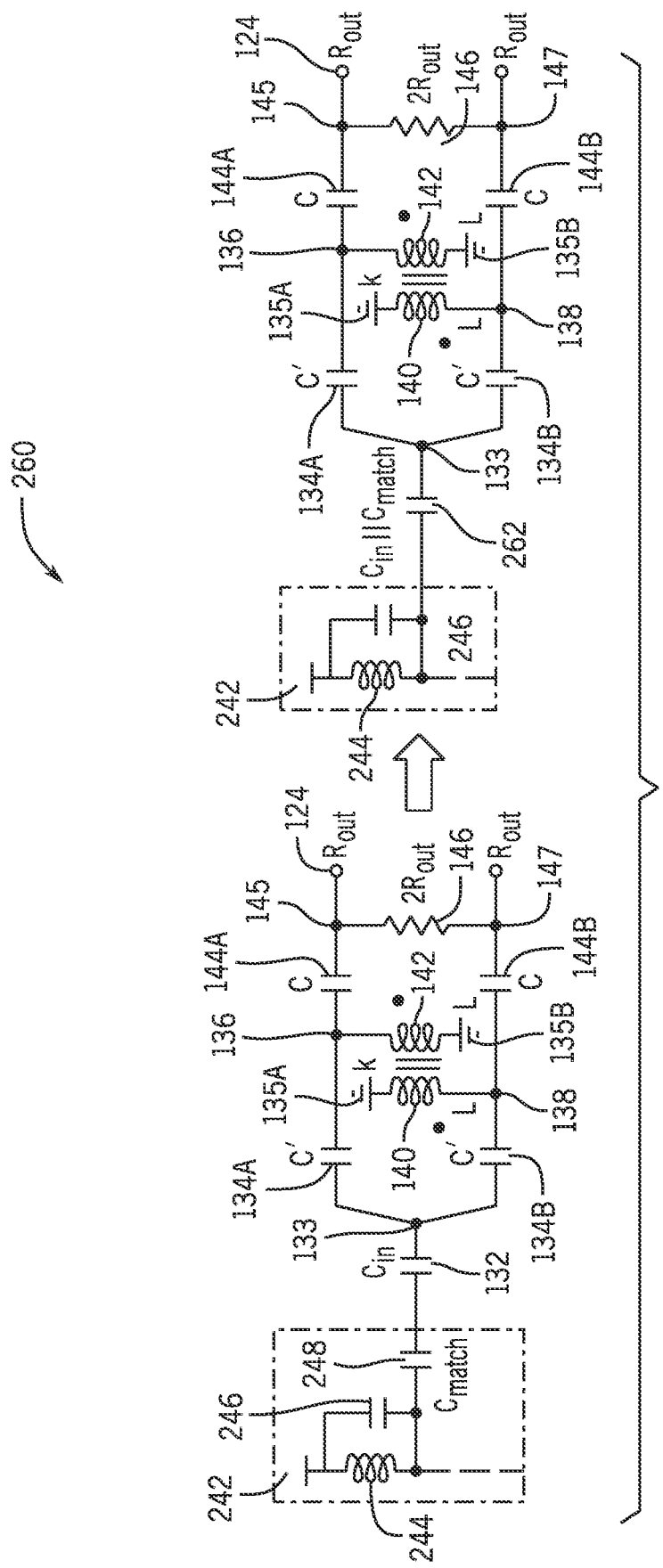
FIG. 14 is a circuit diagram of the alternative splitter/combiner circuitry of FIG. 7 combined with one or more components of an output-matching circuit, according to embodiments of the present disclosure.

Similarly, the splitter/combiner circuitry 130 of FIG. 7 may receive signals from the amplifier 66 to split the signals to facilitate beam-forming and transmission when operating as a splitter 69. In order to ensure correct beam-forming and transmission, the amplifier 66 may use an output-matching circuit to match or correlate the impedance of the amplifier 66 to that of the splitter/combiner circuitry 130. In some cases, the output-matching circuit may introduce additional surface area and/or components into the transceiver 30 that may increase the size and/or complexity of the transceiver 30. With the foregoing in mind, FIG. 14 is a circuit diagram 260 of the splitter/combiner circuitry 130 of FIG. 7 combined with the one or more components of an output-matching circuit 242.

The output-matching circuit 242 may include an inductive element 244 coupled in parallel with the capacitive element 246. The output-matching circuit 242 may include the capacitive element 248 coupled in series to the parallel arrangement of the inductive element 244 and the capacitive element 246. The capacitive element 248 may have the capacitance $C_{match}$ to facilitate output-matching of the amplifier 82 and the splitter/combiner circuitry 130.

Due to the configuration of the components in the splitter/combiner circuitry 130, the capacitive element 248 and the capacitive element 132 may be combined together and disposed as a capacitive element 262 in the splitter/combiner circuitry 130. That is, the capacitance of the capacitive element 132 may be adjusted to the capacitance determined by Equation 11 below:

$$C_{in} = \frac{C_{in} * C_{match}}{C_{in} - C_{match}} \qquad \text{(Equation 11)}$$

As such, combining the components of the output-matching circuit 242 may reduce the surface area and/or the complexity of the transceiver 30 when compared to having a separate output-matching circuit 248 disposed in the transceiver 30.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. Splitter circuitry, comprising:
a first capacitive element and a second capacitive element coupled to an input terminal;
a first inductor comprising a first end coupled to the first capacitive element and a first output terminal, and a second end coupled to ground; and
a second inductor comprising a first end coupled to the second capacitive element and a second output terminal, and a second end coupled to ground, the first inductor and the second inductor being configured to positively inductively couple to one another.

2. The splitter circuitry of claim 1, comprising a third capacitive element coupled between the first capacitive element and the first end of the first inductor.

3. The splitter circuitry of claim 2, wherein the third capacitive element is coupled between the second capacitive element and the first end of the second inductor.

4. The splitter circuitry of claim 1, wherein the splitter circuitry is configured to enable a target frequency range to pass through and filter frequencies other than the target frequency range.

5. The splitter circuitry of claim 4, wherein capacitances of the first capacitive element and the second capacitive element are based on the target frequency range.

6. The splitter circuitry of claim 5, wherein the capacitances are based on resistances of the input terminal, the first output terminal, and the second output terminal.

7. The splitter circuitry of claim 1, comprising a third capacitive element coupled between the first inductor and the first output terminal, and a fourth capacitive element coupled between the second inductor and the second output terminal.

8. The splitter circuitry of claim 7, wherein the third capacitive element, the fourth capacitive element, the first output terminal, and the second output terminal are coupled to a resistive element.

9. A receiver, comprising:
a low noise amplifier; and
combiner circuitry coupled to the low noise amplifier, the combiner circuitry comprising
a first capacitive element coupled to a first input terminal,
a second capacitive element coupled to a second input terminal,
a first inductor coupled to
the first capacitive element and an output terminal at a first end, and
ground at a second end, and
a second inductor coupled to
the second capacitive element and the output terminal at a first end, and
ground at a second end, the second inductor configured to positively inductively couple to the first inductor.

10. The receiver of claim 9, wherein the combiner circuitry is configured to enable a target frequency to pass through and filter frequencies other than the target frequency.

11. The receiver of claim 10, wherein capacitances of the first capacitive element and the second capacitive element are based on the target frequency and resistances of the first input terminal, the second input terminal, and the output terminal.

12. The receiver of claim 9, wherein the combiner circuitry comprises a third capacitive element coupled between the first capacitive element and the first inductor at a first end of the third capacitive element and coupled between the second capacitive element and the second inductor at a second end of the third capacitive element.

13. An electronic device comprising:
a plurality of antennas configured to receive a plurality of signals; and
a receiver electrically coupled to the plurality of antennas, the receiver comprising combiner circuitry configured to receive the plurality of signals and generate an output signal, the combiner circuitry comprising
a pair of capacitive elements coupled to a respective input terminal of a pair of input terminals, and
a pair of inductive elements, each inductive element of the pair of inductive elements coupled to a respective capacitive element of the pair of capacitive elements and an output terminal at a respective first end, and coupled to ground at a respective second end, the pair of inductive elements configured to positively inductively couple together and generate the output signal.

14. The electronic device of claim 13, wherein the receiver comprises an additional pair of capacitive elements coupled to the output terminal via an output capacitive element and coupled to the pair of inductive elements, wherein the output capacitive element is coupled between each respective capacitive element of the additional pair of capacitive elements and the output terminal.

15. The electronic device of claim 14, wherein each inductive element of the pair of inductive elements and each capacitive element of the additional pair of capacitive elements is coupled to the output capacitive element.

16. The electronic device of claim 13, wherein a first input terminal of the pair of input terminals is coupled to a second input terminal of the pair of input terminals via a resistive element.

17. The electronic device of claim 13, wherein the combiner circuitry is configured to enable a target frequency to pass through and filter frequencies other than the target frequency.

18. The electronic device of claim 17, wherein inductances of the pair of inductive elements are based on the target frequency, resistances of the output terminal and the pair of input terminals, and a coupling factor of the pair of inductive elements.

19. The receiver of claim 12, wherein the combiner circuitry comprises a fourth capacitive element coupled to the first inductor and the output terminal, and a fifth capacitive element coupled to the second inductor and the output terminal.

20. The receiver of claim 19, wherein a capacitance of the third capacitive element is based on the capacitances of the first capacitive element, the second capacitive element, the fourth capacitive element, and the fifth capacitive element, and a coupling factor of the first inductor and the second inductor.

* * * * *